US 7,984,924 B2
Jul. 26, 2011

(12) United States Patent
Yamada et al.

(54) AIRBAG APPARATUS FOR A FRONT PASSENGER'S SEAT

(75) Inventors: Ikuo Yamada, Aichi-ken (JP); Yasushi Okada, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 12/609,399

(22) Filed: Oct. 30, 2009

(65) Prior Publication Data

US 2010/0117338 A1    May 13, 2010

(30) Foreign Application Priority Data

Nov. 7, 2008   (JP) ................................. 2008-287156

(51) Int. Cl.
*B60R 21/16*    (2006.01)

(52) U.S. Cl. .................................................. 280/743.2

(58) Field of Classification Search .................. 280/738, 280/739, 742, 743.1, 743.2, 728.2
See application file for complete search history.

(56) References Cited

U.S. PATENT DOCUMENTS

| 7,150,470 | B2 * | 12/2006 | Okada et al. ............... 280/743.1 |
| 7,360,789 | B2 * | 4/2008 | Bito ............................... 280/732 |
| 7,455,317 | B2 * | 11/2008 | Bito ........................... 280/743.2 |
| 7,475,906 | B2 * | 1/2009 | Goto et al. ................. 280/743.2 |
| 7,530,596 | B2 * | 5/2009 | Bito ............................... 280/739 |
| 7,600,782 | B2 * | 10/2009 | Ishiguro et al. ............... 280/739 |
| 7,806,431 | B2 * | 10/2010 | Yamada et al. ............... 280/732 |

FOREIGN PATENT DOCUMENTS

JP    A-2006-096322    4/2006

\* cited by examiner

*Primary Examiner* — Paul N Dickson
*Assistant Examiner* — Robert A Coker
(74) *Attorney, Agent, or Firm* — Posz Law Group, PLC

(57) ABSTRACT

An airbag apparatus which has an airbag provided at least either on the left side or right side of the circumferential wall with an exhaust opening is disclosed. The exhaust opening is comprised of part of a lap portion of the airbag where a terminal of a front section of the circumferential wall and a terminal of a rear section of the circumferential wall overlap in such a manner that the front section is located inside of the rear section. The front section includes a band portion that extends toward the projecting point of the airbag at full inflation and is coupled to the rear section. The band portion is folded away from the terminal of the front section in a folded-up configuration of the airbag.

7 Claims, 21 Drawing Sheets

⇩ ure of the airbag due to the inner pressure
AIRBAG APPARATUS FOR A FRONT PASSENGER'S SEAT The present application claims priority from Japanese Patent Application No. 2008-287156 of Yamada et al., filed on Nov. 7, 2008, the disclosure of which is hereby incorporated into the present application by reference.

BACKGROUND OF THE INVENTION

1. Field of the Invention

The present invention relates to an airbag apparatus mountable on a top plane of the instrument panel in front of the front passenger's seat and including an inflatable airbag.

2. Description of Related Art

JP 2006-96322 A is illustrative of a conventional airbag apparatus provided for a front passenger's seat. This airbag apparatus includes an airbag that is provided with an exhaust hole openable upon contacting an occupant seated very close the instrument panel (namely, a "nearby occupant"). The exhaust hole is comprised of a gap of a lap portion where base cloths forming the circumferential wall of the airbag overlap. When the airbag contacts the nearby occupant in the course of inflation, the base cloths on the lap portion separate from each other and provide the exhaust hole to allow venting of inflation gas. When the airbag completes inflation, the inner pressure of the airbag and the tensile force exerting over an entire circumferential wall of the airbag due to the inner pressure make the base cloths on the lap portion contact each other and closes the exhaust hole.

The exhaust hole of the above reference is located on a top area of the airbag as fully inflated. Conventionally, a top-mount airbag for a front passenger's seat is folded up and housed in a housing located on an interior of a top plane of an instrument panel. In operation, the airbag once protrudes upward and unfolds and expands rearward in the space between the top plane of the instrument panel and a windshield. If the conventional airbag described above is mounted on a compact car which has a small space between the instrument panel and windshield, the airbag as activated may stuff the space when a nearby occupant contacts the instrument panel. In that case, it is possible that an area around the exhaust hole is pressed onto the windshield and the opening of the exhaust hole is obstructed.

SUMMARY OF THE INVENTION

An object of the present invention is to solve the above problem and to provide an airbag apparatus for a front passenger's seat that is capable of protecting a nearby occupant properly without giving him/her an undue pressure.

The object of the invention is attained by such an airbag apparatus as follows:

An airbag apparatus adapted to be mounted on an interior of a top plane of an instrument panel in front of a front passenger's seat of a vehicle, comprising: an inflatable airbag housed in a housing in a folded-up configuration for deployment in a space between the instrument panel and a windshield, the airbag including:
  an occupant side wall deployable generally upright toward the seat;
  a circumferential wall extending forward from the peripheral edge of the occupant side wall in a tapering fashion, thus the airbag at full inflation having a generally square conical contour whose top is located at the front end, the circumferential wall including a front section that is on the side of the front end of the airbag at full inflation and a rear section that is on the side of the occupant side wall, wherein the front section and rear section overlap with each other at the respective terminals such that the terminal of the front section is located inside of that of the rear section and the terminals are partially coupled together, thus providing a lap portion;
  an inlet port located proximate the front end at full inflation in the front section of the circumferential wall for introducing inflation gas;
  an exhaust opening formed at least either on a left side or right side of the circumferential wall and comprised of an uncoupled region of the lap portion, the exhaust hole being openable for exhausting inflation gas when contacting an occupant seated close to the airbag apparatus in the course of inflation and closing at full inflation of the airbag;
  a redirecting cloth located inside the airbag so as to cover the inlet port and provided on opposite ends in an anteroposterior direction with openings for releasing inflation gas to the front and rear; and
  a band portion that is formed on the terminal of the front section of the circumferential wall, the band portion extending from the location of the exhaust opening on the terminal toward a projecting point of the airbag at full inflation and being coupled to the rear section or occupant side wall by the leading end;
    wherein a length of the band portion from a front end of the terminal of the front section to the leading end of the band portion equals to a film length of the rear section from a front end of the terminal of the rear section to a seam of the band portion; and
    wherein, in a folded-up and housed condition of the airbag, the band portion is folded toward the center in a left and right direction of the airbag, away from the terminal of the front section.

In this airbag apparatus of the invention, the openable and closable exhaust opening is comprised of an uncoupled region of the lap portion. The lap portion is so formed that the terminal of the front section is located beneath or inside the terminal region of the rear section. The front section includes the band portion that extends from the location of the exhaust opening on its terminal toward the projecting point of the airbag at full inflation (i.e. toward the occupant side wall) and coupled to the rear section or the occupant side wall. In the folded-up and housed condition of the airbag, moreover, the band portion is folded toward the center in a left and right direction of the airbag, away from the terminal of the front section. Since the airbag is internally provided with the redirecting cloth that redirects inflation gas toward the front and rear, the inflation gas fed from the gas inlet port flows into the airbag along an anteroposterior direction.

In the initial stage of airbag inflation of the above airbag apparatus, due to the redirection by the redirecting cloth, the inflation gas does not flow toward the band portion, but flows along the inner circumference of the rear section of the circumferential wall, such that the band portion is kept folded toward the center in a left and right direction of the airbag. At this time, the band portion kept folded toward the center pulls the terminal of the front section inward and away from the rear section, so that the terminals of the front section and rear section are allowed to separate from each other at the uncoupled region, and thus providing the exhaust opening so the inflation gas is allowed to be vented to the outside. Accordingly, in the event that the airbag contacts with an occupant too close to the instrument panel In the initial stage of airbag inflation, the exhaust opening will be opened and let the inflation gas out smoothly, such that the occupant will not be given an undue pressure.

On the other hand, when an occupant is seated in a normal position, the airbag inflates without contacting the occupant until the occupant side wall moves rearward, so that the band portion unfolds and extends along with the rearward movement of the occupant side wall. The band portion is continuous with the front section and its length is so determined that the distance between the front end of the terminal of the front section to the leading end of the band portion conforms to the film length of the rear section between the front end of the terminal to the seam of the band portion. With this configuration, when the occupant side wall moves rearward upon airbag inflation, the inner pressure of the airbag due to inflow of inflation gas holds the band portion down onto the inner circumference of the rear section and extends the same along the inner circumference of the rear section. When the airbag completes deployment, the terminal of the front section is held down on and arranged along the terminal of the rear section at the location of the exhaust opening, and thus closing the exhaust opening. As a result, the airbag completes deployment without releasing inflation gas from the exhaust opening, and thus protects the occupant seated at normal position with sufficient cushioning property.

The exhaust opening of the airbag apparatus is formed at least either on a left side or right side of the circumferential wall of the airbag at full deployment. That is, the exhaust opening is formed on the area which is not expected to contact with the windshield or instrument panel upon airbag deployment. Accordingly, the exhaust opening will securely open when contacting a nearby occupant.

Therefore, the airbag apparatus for a front passenger's seat of the present invention is capable of protecting a nearby occupant properly without giving him/her an undue pressure.

If the exhaust opening is formed on both of the left side and right side of the circumferential wall, the airbag will quickly inflate into a steady contour, without oscillating in a left and right direction.

DESCRIPTION OF PREFERRED EMBODIMENTS

Preferred embodiments of the present invention are described below with reference to the accompanying drawings. However, the invention is not limited to the embodiments disclosed herein. All modifications within the appended claims and equivalents relative thereto are intended to be encompassed in the scope of the claims.

Figure 1:
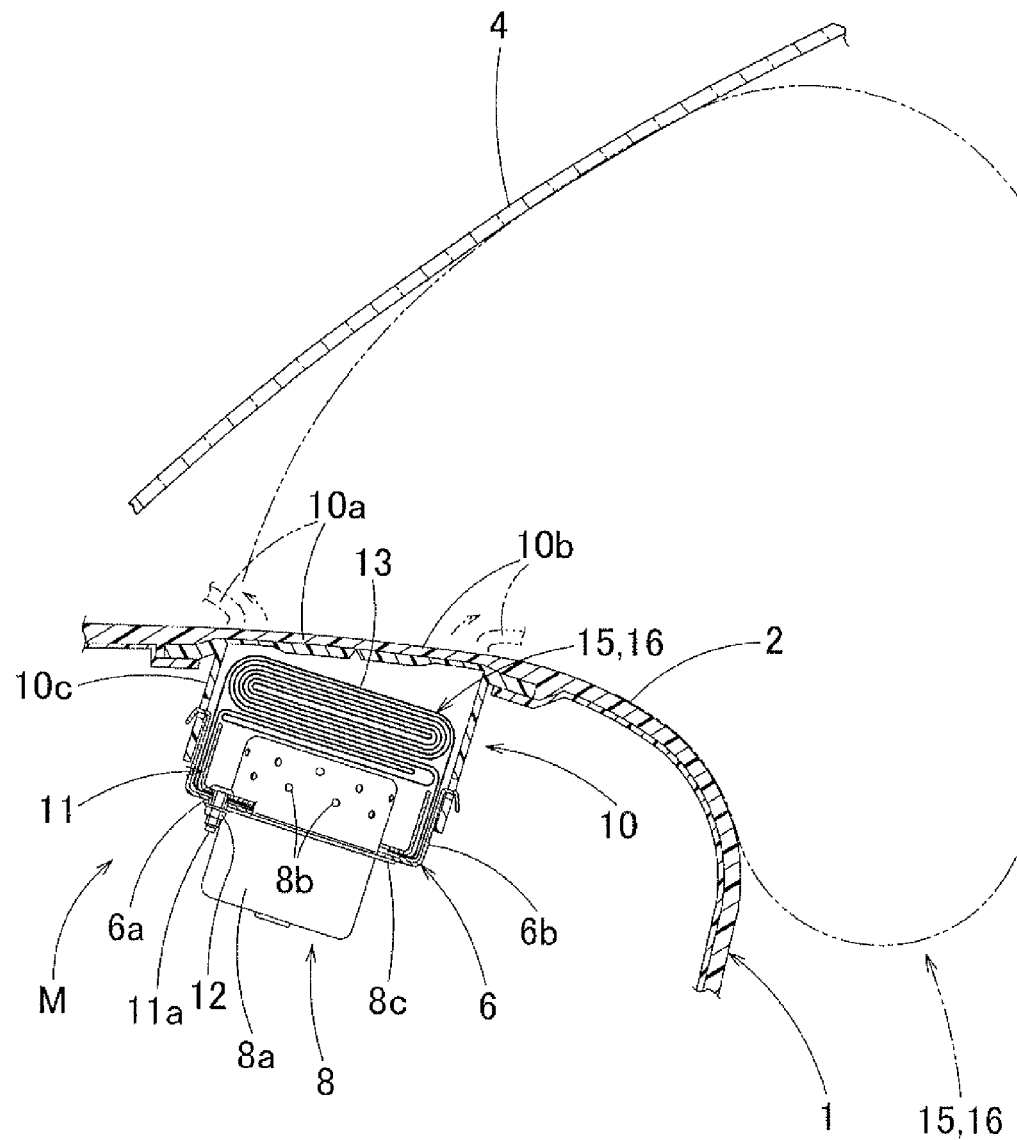
FIG. 1 is a sectional view of an airbag apparatus for a front passenger's seat embodying the invention taken along an anteroposterior direction.

FIG. 1 illustrates an airbag apparatus M for a front passenger's seat embodying the present invention. The airbag device M is a top-mount type that is located in an interior of a top plane 2 of an instrument panel or dashboard 1 of a vehicle. The vehicle on which the airbag apparatus M is mounted is a vehicle in which an inclination angle of the windshield 4 relative to a horizontal direction is relatively small and thus the distance between the top plane 2 of the dashboard 1 and windshield 4 is accordingly small.

The airbag apparatus M includes a folded-up airbag 15, an inflator 8 for supplying the airbag 15 with inflation gas, a case 6 housing and holding the airbag 15 and the inflator 8, a retainer 11 that attaches the airbag 15 to the case 6, and an airbag cover 10 arranged over the airbag 15.

Unless otherwise specified, up/down, front/rear and left/right directions in this specification are intended to refer to up/down, front/rear and left/right directions of the vehicle.

Referring to FIG. 1, the airbag cover 10 is integral with the dashboard 1 fabricated of synthetic resin. The airbag cover 10 includes two doors 10a and 10b openable respectively forward and rearward upon activation of the airbag apparatus M and a joint wall 10c formed around the doors 10a and 10b for engagement with the case 6.

The inflator 8 includes a generally columnar body 8a provided with a plurality of gas discharge ports 8b and a flange 8c by which the inflator 8 is attached to the case 6.

The case 6 is made of sheet metal and has a generally rectangular parallelepiped shape with a rectangular opening at the top. As shown in FIG. 1, the case 6 includes a bottom wall 6a having a generally rectangular plate shape and a circumferential wall 6b extending upward from the peripheral edge of the bottom wall 6a for engagement with the joint wall 10c of the airbag cover 10. The inflator 8 is attached to the bottom wall 6a of the case 6. The case 6 further includes on the bottom wall 6a an unillustrated bracket connected to the vehicle body structure.

The retainer 11 is annular in shape and has bolts 11a. The airbag 15 and the inflator 8 are secured to the case 6 by locating the retainer 11 inside the airbag 15 such that the bolts 11a are put through the airbag 15, the bottom wall 6a of the case 6 and the flange 8c of the inflator 8, and then fastened into nuts 12.

The airbag 15 includes a bag body 16 and a redirecting cloth 50 that is located inside the bag body 16 and controls direction of inflation gas G fed from a later-described inlet port 28.

Figure 23:
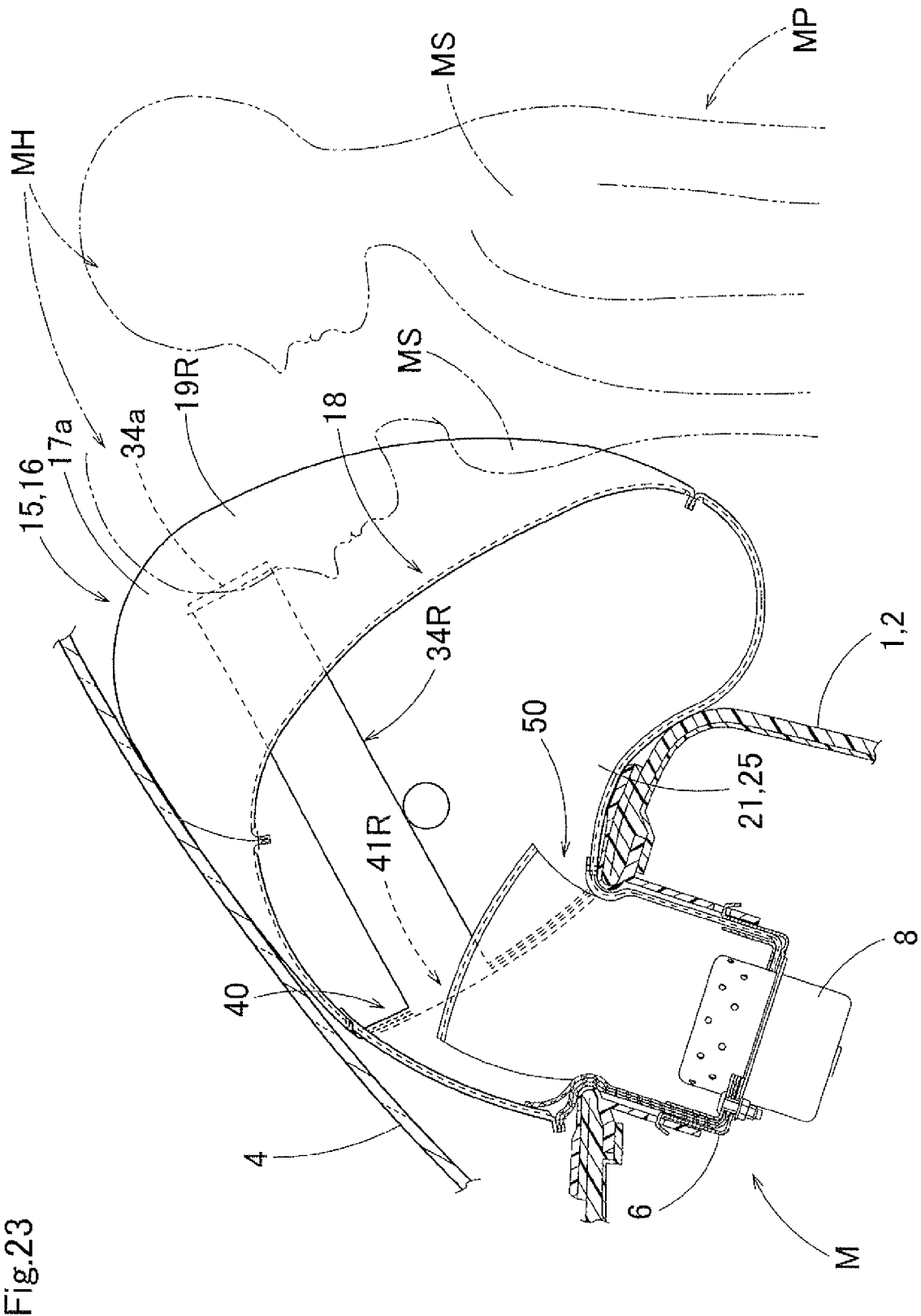
FIG. 23 is a schematic vertical section of the airbag apparatus as the airbag is fully inflated, taken along an anteroposterior direction.

As shown in FIGS. 1 and 23, the bag body 16 as fully inflated is deployable in a space between the top plane 2 of the dashboard 1 and windshield 4. More specifically, referring to FIGS. 2 to 4, the bag body 16 is inflatable into a generally square conical contour whose front end is the top of the square cone. The bag body 16 includes an occupant side wall 17 deployable generally upright at the rear and a circumferential wall 21 extending forward from the outer peripheral edge of the occupant side wall 17 and tapering toward the front end in a generally conical fashion.

Figure 3:
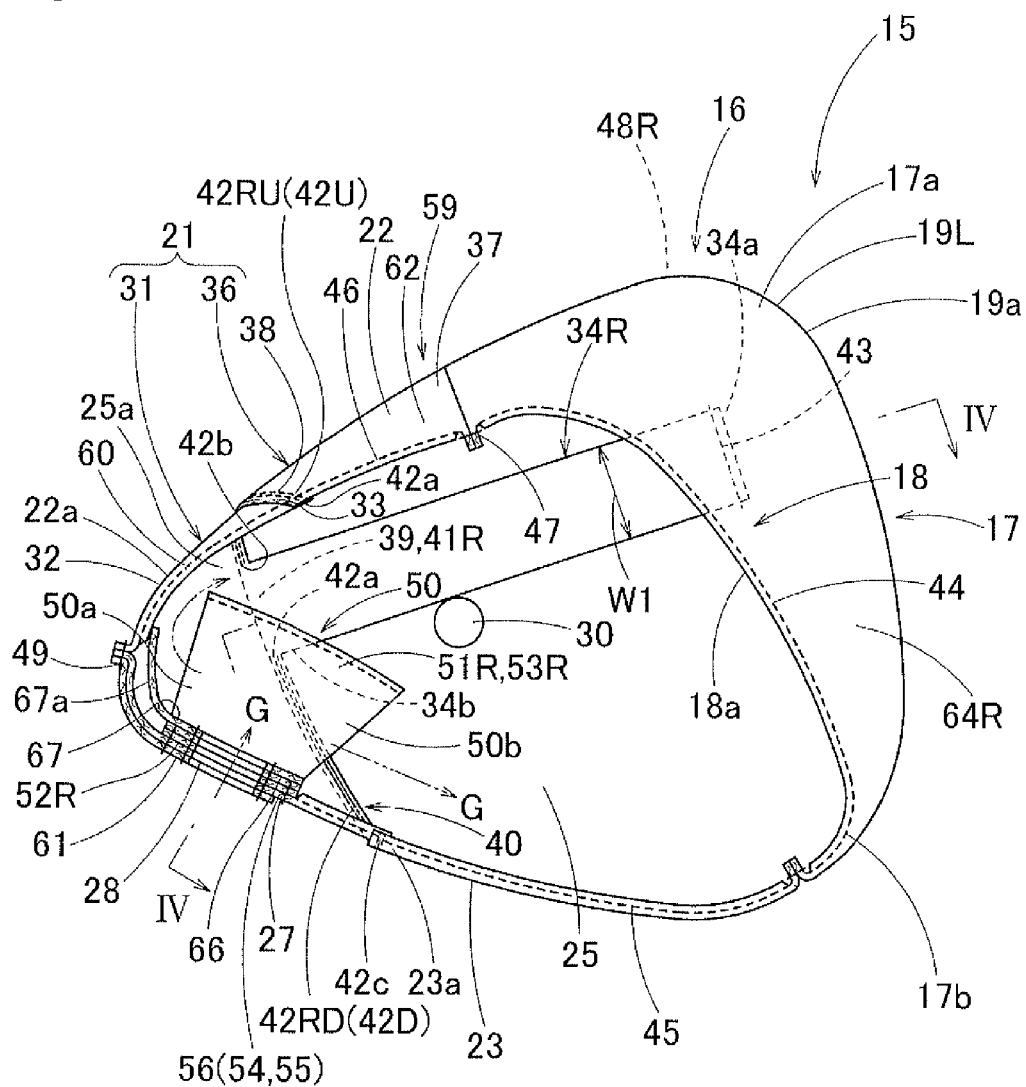
FIG. 3 is a sectional view of the airbag of FIG. 2 taken along an anteroposterior direction.
Figure 4:
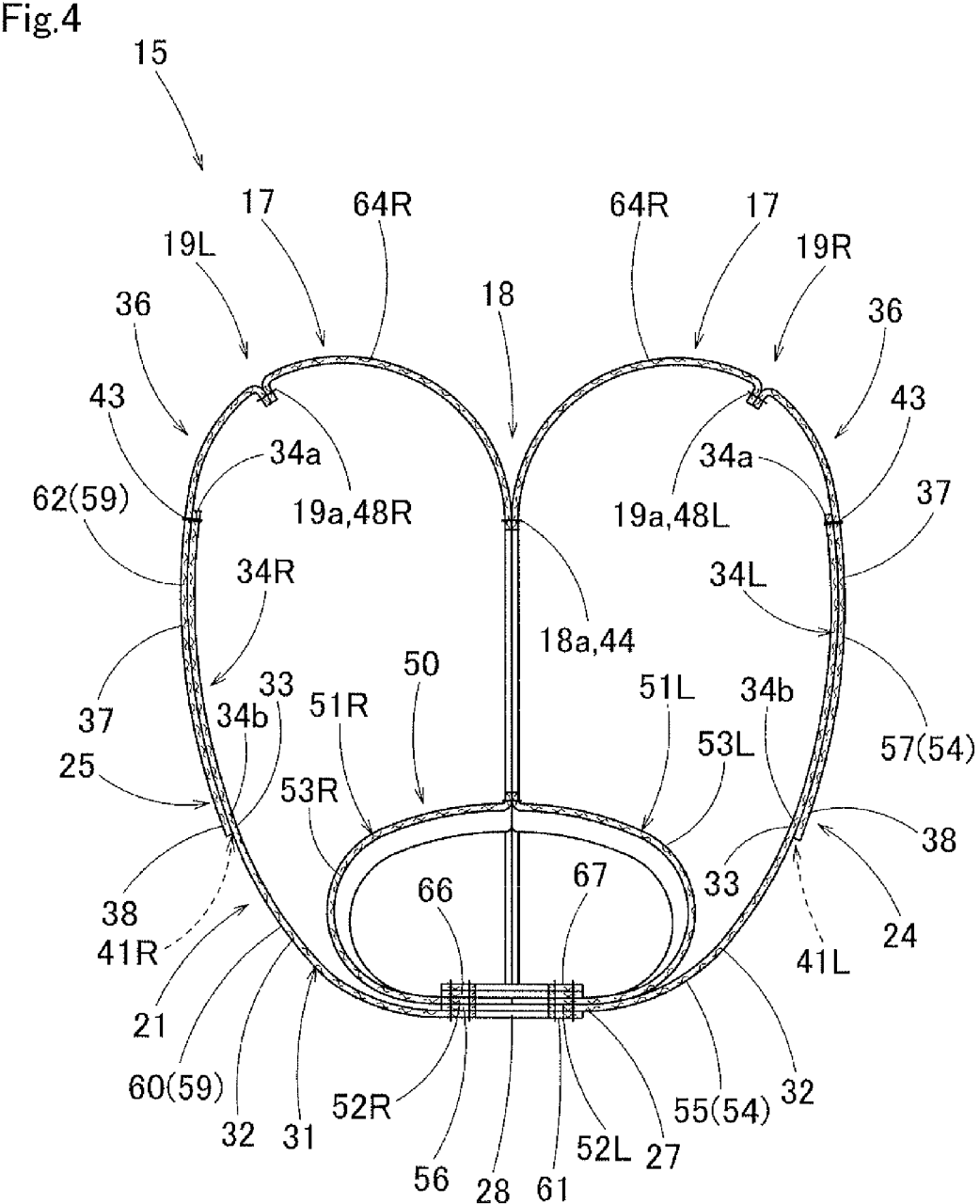
FIG. 4 is a sectional view taken along line IV-IV of FIG. 3.
Figure 22:
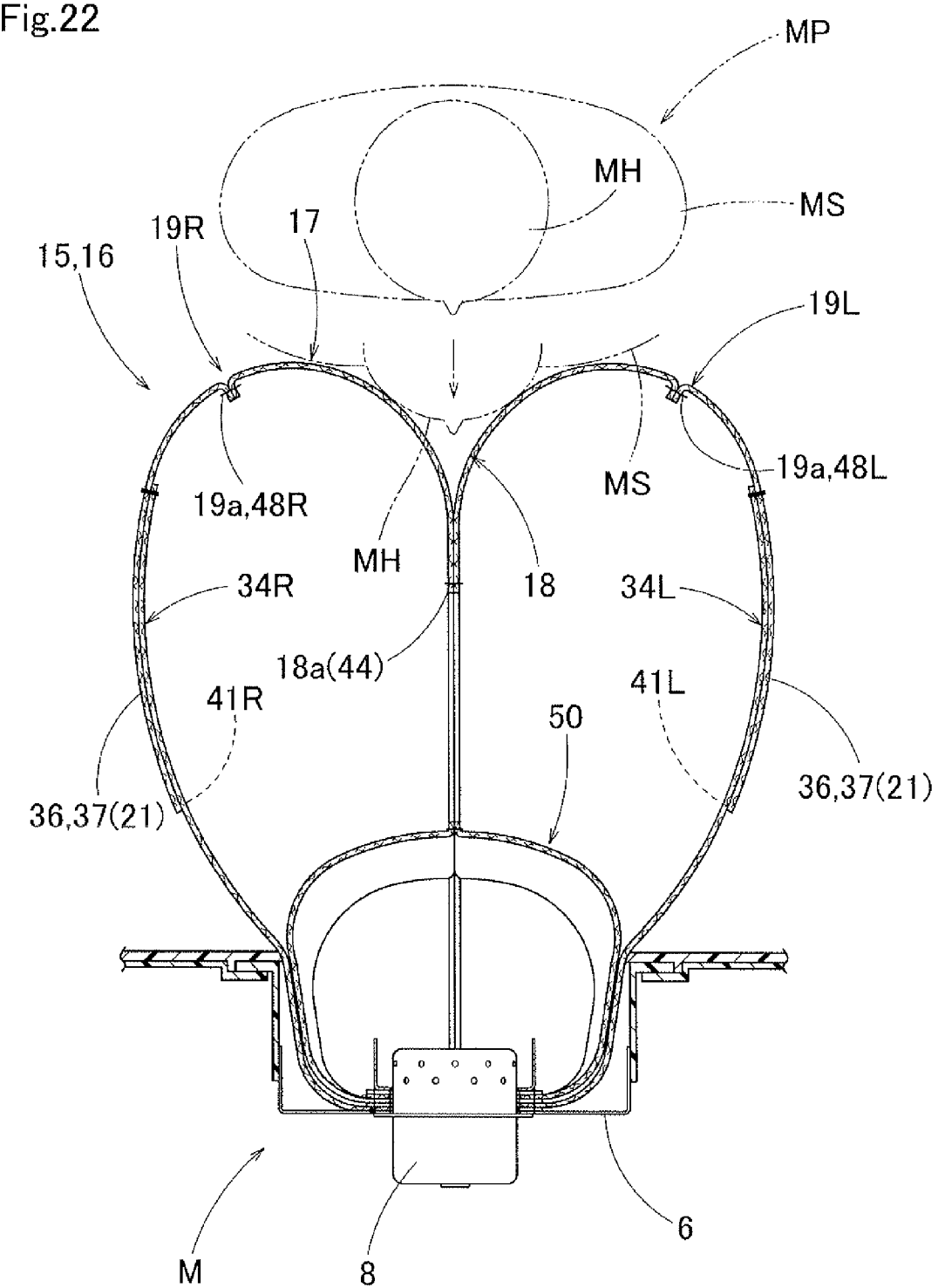
FIG. 22 is a schematic horizontal section of the airbag apparatus as the airbag is fully inflated.

The occupant side wall 17 faces toward an occupant and has unevenness at full deployment. As shown in FIGS. 3 and 4, specifically, the occupant side wall 17 at full deployment includes a recess 18 that recesses forward at the center in a left and right direction thereof and raised regions 19L and 19R that project relatively rearward on the left and right of the recess 18. The recess 18 and raised regions 19L and 19R extend throughout the occupant side wall 17 vertically in a continuous fashion, respectively. When an occupant (seated in a normal position) MP bumps into the occupant side wall 17, the raised regions 19L and 19R firstly restrain shoulders MS of the occupant MP, and in that state, the head MH of the occupant MP enters into the recess 18 and an area around the recess 18 cushions the head MH (FIGS. 22 and 23). The unevenness created by the raised regions 19L and 19R and the recess 18 is most prominent at the upper end 17a of the occupant side wall 17 and continues to the lower end 17b of the occupant side wall 17 and to the front end 22a of a later-described upper wall 22 of the circumferential wall 21, while converging. In this embodiment, the seam 44 that sews inner circumferential edges 64a of later-described left inner panel 64L and a right inner panel 64R together forms the bottom or leading end 18a of the recess 18 whereas the seams 48L and 48R that respectively sew up each of outer circumferential edges 64c of the left and right inner panels 64L and 64R and each of corresponding rear edges 54d and 59d of later-described left outer panel 54 and right outer panel 59 form tops 19a of the raised regions 19L and 19R.

The circumferential wall 21 includes an upper side wall 22 and a lower side wall 23 extending generally along a left and right direction on upper and lower sides, a left side wall 24 and a right side wall 25 extending generally along an anteroposterior direction on the left and right sides. A round gas inlet port 28 that takes in inflation gas is formed on the center in a left and right direction proximate the front end of the lower side wall 23, which is proximate the front end of the bag body 16 at full inflation. In the peripheral area 27 of the gas inlet port 28 are a plurality of mounting holes 29 for receiving the bolts 11a of the retainer 11 that secure the peripheral area 27 to the bottom wall 6a of the case 6. The left side wall 24 and right side wall 25 is each provided with a vent hole 30 for releasing extra inflation gas. In this specific embodiment, the vent hole 30 is formed on a later-described rear section 36 at the rear of a later-described exhaust opening 41L/41R as shown in FIGS. 2 and 3.

Figure 2:
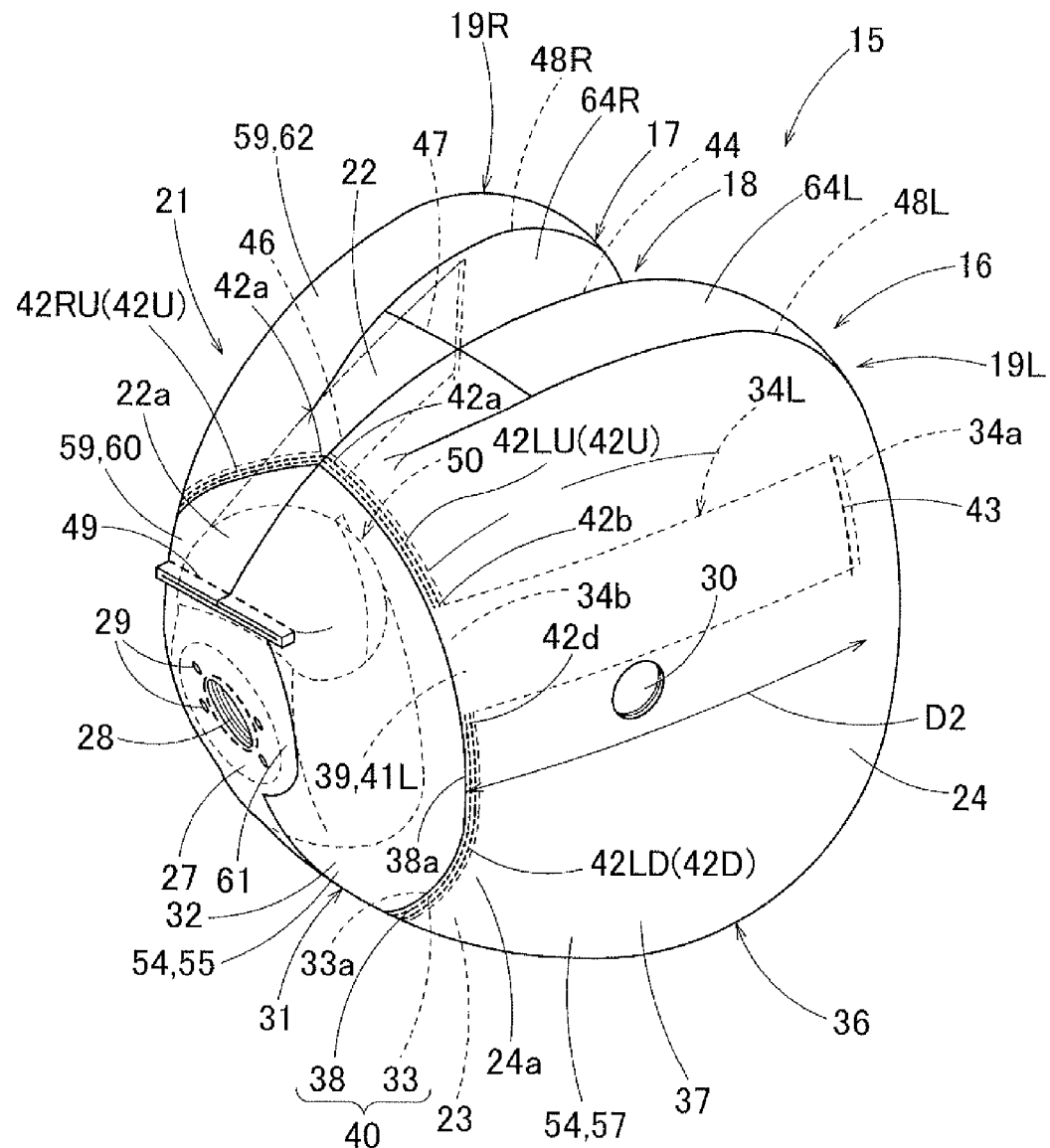
FIG. 2 is a perspective view of an airbag of the airbag apparatus of FIG. 1 in an inflated state, as viewed from the front.

Referring to FIGS. 2 to 4, the circumferential wall 21 is comprised of a front section 31 that is located on the side of the gas inlet port 28 and a rear section 36 that is located on the side of the occupant side wall 17. The front section 31 includes a general region 32 constituting an area of the circumferential wall 21 proximate the gas inlet port 28 and a terminal region 33 that is located at the rear of the general region 32 and extends over an entire area in a left and right direction. The rear section 36 includes a general region 37 constituting an area of the circumferential wall 21 proximate the occupant side wall 17 and a terminal region 38 that is located in front of the general region 37 and extends over an entire area in a left and right direction. The terminal region 33 located on the rear area of the front section 31 and the terminal region 38 located on the front area of the rear section 36 overlap each other in an in and out direction (in a left and right direction) of the bag body 16 and thus form a lap portion 40. In this specific embodiment, the terminal region 33 of the front section 31 is arranged beneath or on the inner side of the terminal region 38 of the rear section 36. As shown in FIGS. 2 and 3, this lap portion 40 is formed in the vicinity of the gas inlet port 28 where the circumferential wall 21 gradually enlarges toward the occupant side wall 17, i.e. in the vicinity of front ends 22a, 23a, 24a and 25a of the upper side wall 22, lower side wall 23, left side wall 24 and right side wall 25. In other words, the lap portion 40 extends over an entire circumference of the circumferential wall 21 around the gas inlet port 28. More specifically, the distance between the gas inlet port 28 and the lap portion 40 on the upper side wall 22 is greater than that on the lower side wall 23, such that the lap portion 40 forms an angle with the opening plane of the gas inlet port 28 at full deployment of the bag body 16 (FIG. 3).

Figure 20:
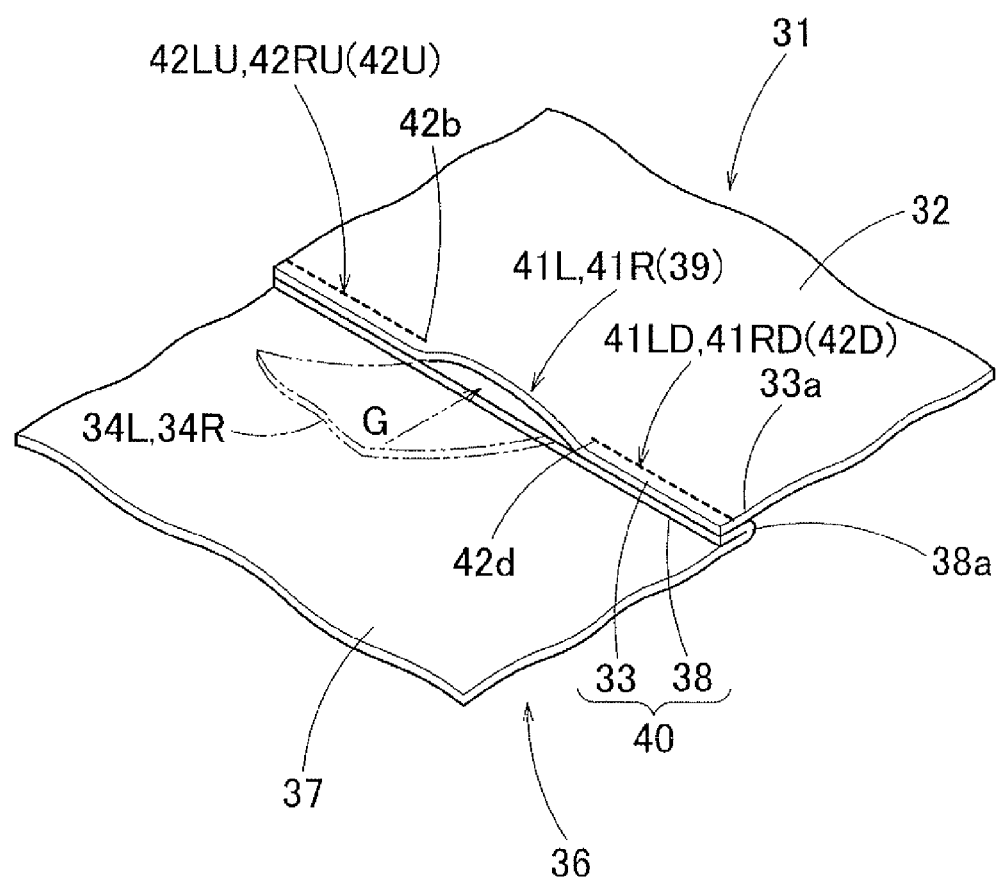
FIG. 20 is a schematic partial enlarged perspective view illustrating the way an exhaust opening is open.

The terminal regions 33 and 38 superimposed one above the other are coupled or sewn together except the areas of the exhaust openings 41L and 41R. The exhaust openings 41L and 41R are respectively formed on the left side wall 24 and right side wall 25 of the circumferential wall 21. The exhaust openings 41L and 41R of this embodiment are located on the center in a vertical direction of the left side wall 24 and right side wall 25, respectively, and comprised of unsewn regions 39 disposed between seams 42U and 42D that couple or sew the terminal regions 33 and 38 together. As shown in FIGS. 2, 3 and 20, the seam 42U is formed to extend upward from the exhaust openings 41L and 41R (or the unsewn regions 39) whereas the seam 42D extends downward from the exhaust openings 41L and 41R (or the unsewn regions 39). In this embodiment, the seam 42U is comprised of the seam 42LU that sews together the rear edge 55a (FIG. 5) of the front region 55 of later-described left outer panel 54, which is a material of the airbag 15, and the front edge 57a of the rear region 57 and the seam 42RU that sews together the rear edge 60a of the front region 60 of later-described right outer panel 59 and the front edge 62a of the rear region 62. The seams 42LU and 42RU are coupled together at the upper end 42a and thus forming the seam 42U. The lower ends 42b of the seams 42LU and 42RU define the upper limits of the exhaust openings 41L and 41R. The seam 42D is comprised of the seam 42LD that sews together the rear edge 55a of the front region 55 of the left outer panel 54 and the front edge 57a of the rear region 57 below the exhaust opening 41L and the seam 42RD that sews together the rear edge 60a of the front region 60 of the right outer panel 59 and the front edge 62a of the rear region 62 below the exhaust opening 41R. The seams 42LD and 42RD are coupled together at the lower end 42c and thus forming the seam 42D. The upper ends 42d of the seams 42LD and 42RD define the lower limits of the exhaust openings 41L and 41R.

The terminal regions 33 and 38 on the lap portion 40 overlap each other merely to such extent that mutual connection of the terminal regions 33 and 38 is maintained in a stable manner. Therefore, the width in an anteroposterior direction of the lap portion 40 (overlapping area) is determined as small as possible while securing enough seam allowance. The exhaust openings 41L and 41R open and allow inflation gas G inside the bag body 16 to be exhausted as shown in FIGS. 17 and 20, when the bag body 16 contacts a nearby occupant (small occupant NP1, NP2 such as an infant, FIGS. 16 and 18) and close at full inflation of airbag as shown in FIGS. 22 and 23.

Referring to FIGS. 2 to 4, the front section 31 further includes band portions 34L and 34R that extend toward the occupant side wall 17 from the locations of the exhaust openings 41L and 41R on the terminal region 33. The band portions 34L and 34R are respectively coupled or sewn to the rear section 36 by rear ends or leading ends 34a. The band portions 34L and 34R extend generally orthogonally to the terminal region 33 of the front section 31. That is, the band portions 34L and 34R extend rearward and upward in a inclined fashion relative to the horizontal direction from the vicinity of the center in a vertical direction of the right side wall 24 and left side wall 25 of the circumferential wall 21, and then sewn to the rear section 36 by the leading ends or rear ends 34a in the area of the right side wall 24 and left side wall 25. The width W1 (FIG. 3) of each of the band portions 34L and 34R is generally identical to the width W2 (FIG. 5) of the exhaust opening 41L and 41R (i.e. the width of the unsewn region 39). The length L1 (FIG. 5) of each of the band portions 34L and 34R is such dimension that the distance D1 (FIG. 5) between the front edge 33a of the terminal region 33 in the front section 31, which refers to the boundary between the terminal region 33 and general region 32 and equals to the front edge 38a of the terminal region 38 of the rear section 36, to the leading end 34a of the band portion 34L/34R conforms to the film length D2 (FIG. 2) of the rear section 36 between the front edge 38a of the terminal region 38 to the seam 43 of the band portion 34L/34R.

In this specific embodiment, the leading ends 34a of the band portions 34L and 34R are sewn to the vicinity of the upper end 17a of the occupant side wall 17, proximate the rear upper end of the left side wall 24/right side wall 25. As described later, before being housed in the case 6, the airbag 15 is firstly formed into the preparatorily folded condition where the occupant side wall 17 is flattened out over the folded-up circumferential wall 21 so the upper end region of the occupant side wall 17 is located proximate the gas inlet port 28, and the later-described rear region 71 of the airbag 15 in that state is rolled toward the circumferential wall 21 (FIGS. 1, 14A to 15C). Therefore, in the initial stage of airbag deployment, the airbag 15 firstly unfurls and inflates in such a manner as to push up the area of the upper side wall 22 of the circumferential wall 21 opposing the gas inlet port 28 (i.e. the front end region of the rear section 36), such that the upper end 17a of the occupant side wall 17 is lifted upward along therewith so the occupant side wall 17 stands upright and then deploys rearward. That is, upon airbag deployment, each of the band portions 34L and 34R deploys in such a manner as to follow the moving path of the upper end 17a region of the occupant side wall 17, i.e. as to move generally along the deployment direction of the bag body 16.

The redirecting cloth 50 is located over the gas inlet port 28 inside the bag body 16. The redirecting cloth 50 has a generally cylindrical shape opened at opposite ends in an anteroposterior direction so as to redirect inflation gas G fed via the gas inlet port 28 forward and rearward. That is, as shown in FIG. 3, the inflation gas G fed via the inlet port 28 is supplied into the bag body 16 along an anteroposterior direction from the front and rear openings 50a and 50b of the redirecting cloth 50.

Figure 5:
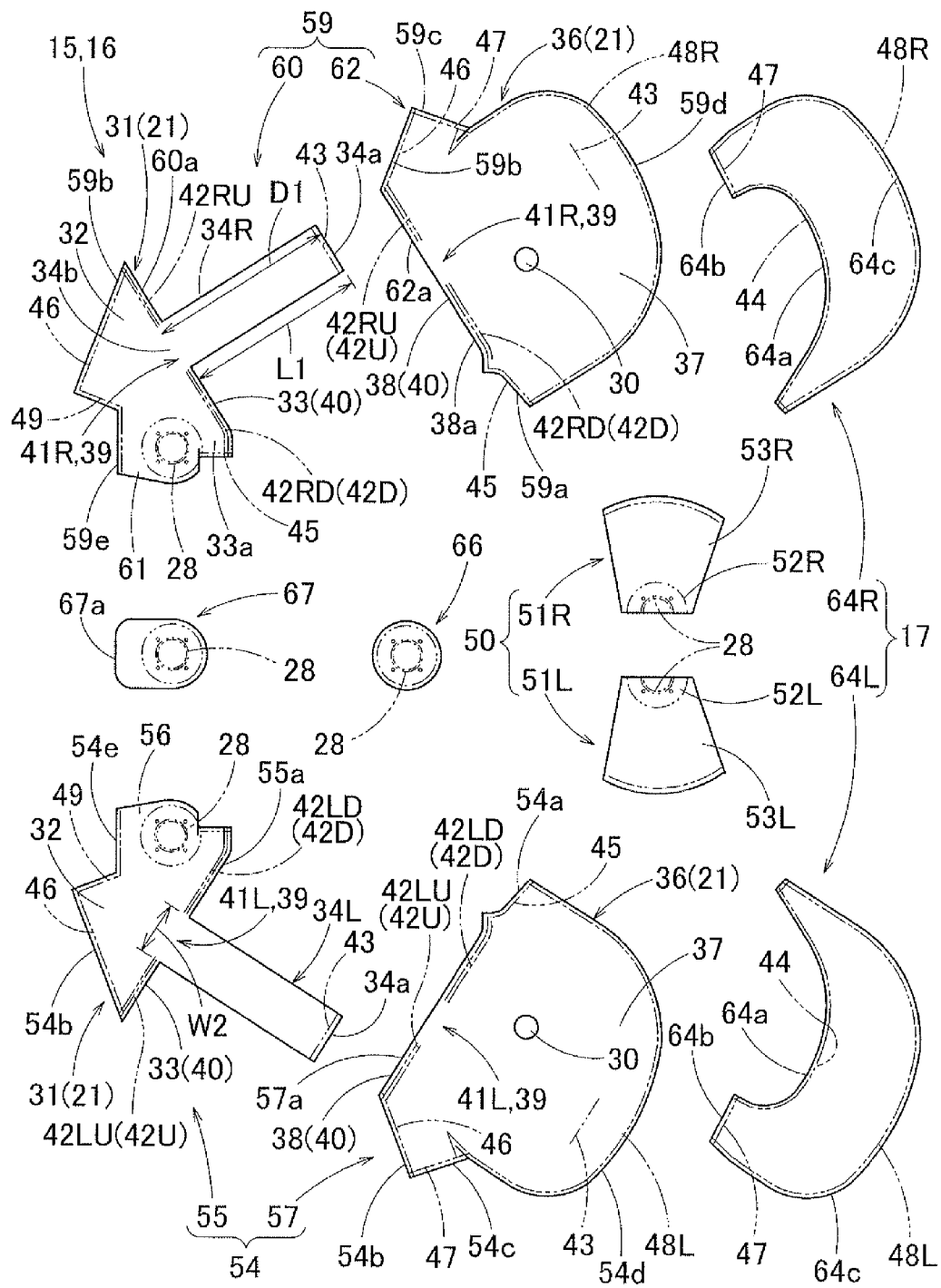
FIG. 5 illustrates base cloths of the airbag of FIG. 2 by plan views.

The redirecting cloth 50 of this specific embodiment is formed of two pieces of material cloths 51L and 51R shown in FIG. 5. The material cloths 51L and 51R are laterally symmetrical and each has a joint portion 52L/52R that forms a left half or right half area of the peripheral area 27 of the gas inlet port 28 and a main body 53L/53R that extends to the left/right from the joint portion 52L/52R. The joint portions 52L and 52R are respectively coupled to the peripheral area 27 of the gas inlet port 28 whereas corresponding edges of the main bodies 53L and 53R are coupled or sewn together, thus providing the redirecting cloth 50. In this embodiment, the joint portions 52L and 52R of the material cloths 51L and 51R are overlaid on the later-described left and right outer panels 54 and 59 together with later-described reinforcing cloths 66 and 67, and sewn together to form the peripheral area 27 of the gas inlet port 28.

In this embodiment, the airbag 15 (bag body 16) is designed to inflate into a laterally symmetric contour relative to the gas inlet port 28.

The bag body 16 is formed by sewing together circumferential edges of predetermined shaped base cloths. As shown in FIG. 5, the bag body 16 of this embodiment is formed of four base cloths: a left outer panel 54 and right outer panel 59 that are located on the outside in a left and right direction of the bag body 16 at full inflation, a left inner panel 64L and right inner panel 64R that are located on the inner side in a left and right direction of the bag body 16 at full inflation.

The left outer panel 54 and right outer panel 59 mainly constitute the circumferential wall 21 and areas of the occupant side wall 17 to the left and right of the tops 19a of the raised regions 19L and 19R. More specifically, the left outer panel 54 and right outer panel 59 form a front area of the upper side wall 22, whole areas of the lower side wall 23, left side wall 24 and right side wall 25 and the areas of the occupant side wall 17 to the left and right of the tops 19a of the raised regions 19L and 19R. The left outer panel 54 and right outer panel 59 are provided as such separate entities that split this area by a parting plane extending in an anteroposterior direction through the center of the gas inlet port 28. Each of the left outer panel 54 and right outer panel 59 is comprised of two split parts; a front region 55/60 that forms the front area proximate the gas inlet port 28 and a rear region 57/62 that forms the rear area located on the side of the occupant side wall 17. The front regions 55 and 60 constitute the front section 31 of the circumferential wall 21 of the bag body 16. Each of the front regions 55 and 60 includes the band portion 34L/34R described above, a rear edge 55a/60a that forms the terminal region 33 of the front section 31 and a projecting portion 56/61 that projects in a generally semicircular shape and constitutes the peripheral area 27 of the gas inlet port 28. The rear region 57 and 62 constitute the rear section 36 of the circumferential wall 21 of the bag body 16. The front edges 57a and 62a of the rear regions 57 and 62 constitute the terminal region 38 of the rear section 36. The front regions 55 and 60, and the rear regions 57 and 62 are respectively formed into symmetrical contour.

The left inner panel 64L and right inner panel 64R are located on the inner side in a left and right direction of the bag body 16 at full inflation. The inner panels 64L and 64R have such contours that an area from the tops 19a of the raised regions 19L and 19R to the bottom 18a of the recess 18 is split up longitudinally. More specifically, the inner panels 64L and 64R have such contours that the above-described area in a range from the rear part of the upper side wall 22 to the occupant side wall 17 is longitudinally split up. In this specific embodiment, each of the left inner panel 64L and right inner panel 64R is formed into a C-shaped band in which the outer circumferential edge 64c and inner circumferential edge 64a are so curved as to project rearward. The curvature of the outer circumferential edges 64c of the inner panels 64L and 64R generally accords to that of the rear edges 54d and 59d of the left and right outer panels 54 and 59.

As shown in FIGS. 3 and 4, the bag body 16 further includes two pieces of reinforcing cloths 66 and 67 that reinforce the peripheral area 27 of the gas inlet port 28. As shown in FIG. 5, the reinforcing cloth 66 is generally round in shape and located over the material cloth 51L and 51R forming the redirecting cloth 50. The reinforcing cloth 67 is arranged over the reinforcing cloth 66 so it is positioned inmost, and includes an extended region 67a that extends forward from the gas inlet port 28. The extended region 67a covers a later-described seam 49 disposed proximate the inlet port 28 and prevents the seam 49 from being hit directly by the inflation gas G that is fed from the inlet port 28 and redirected by the redirecting cloth 50 as shown in FIG. 3.

In this embodiment, the materials of the airbag 15; the left outer panel 54 (the front region 55 and rear region 57), right outer panel 59 (the front region 60 and rear region 62), left inner panel 64L, right inner panel 64R, reinforcing cloths 66, 67 and the materials cloth 51L and 51R of the redirecting cloth 50 are made of flexible woven fabric of polyester, polyamide or the like. The materials of the bag body 16 and redirecting cloth 50 are not coated by such coating composition as silicone.

Manufacturing of the airbag 15 is now described. Firstly, the left inner panel 64L and right inner panel 64R are flattened and superimposed one on the other so that their circumferential edges match each other, and then the inner circumferential edges 64a are sewn together with sewing yarn to form a seam 44 as shown in FIG. 9A.

Figure 6A:
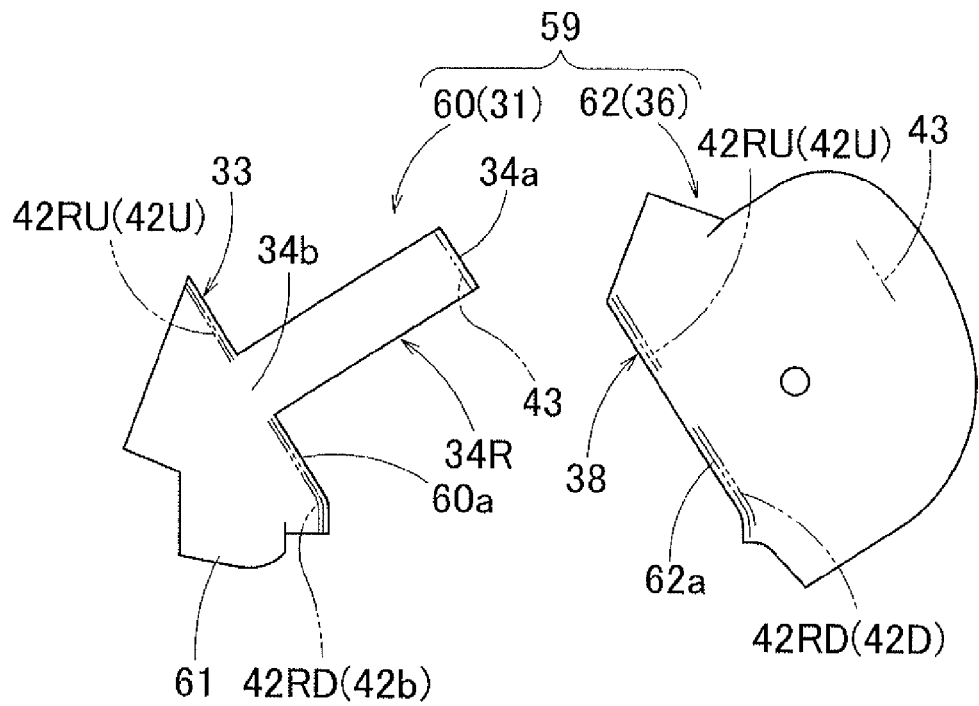
FIGS. 6A and 6B schematically illustrate the manufacturing process of the airbag of FIG. 2.
Figure 6A:
Figure 6B:
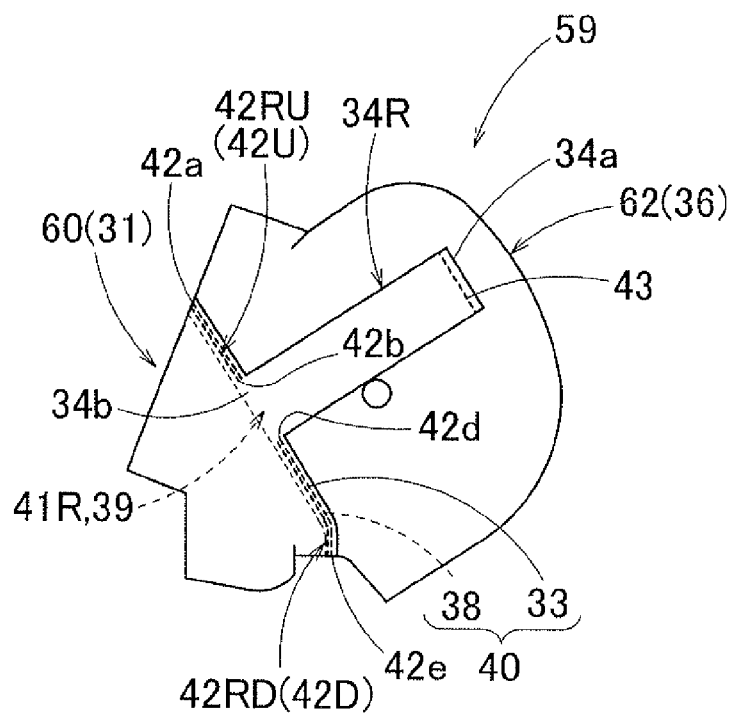

Then as shown in FIGS. 6A and 6B, providing the front region 60 and rear region 62 of the right outer panel 59, the front region 60 is superimposed on the rear region 62 such that the rear edge 60a of the front region 60 and the front edge 62a of the rear region 62 (that is, the terminal regions 33 and 38) overlap. The overlapped terminal regions 33 and 38 are then sewn together with a sewing thread except the area of the root region 34b of the band portion 34R, thus forming the seams 42RU, 42RD, the lap portion 40 and exhaust opening 41R as well as connecting the front region 60 and rear region 62. The leading end 34a of the band portion 34R is sewn to the rear region 62, thus forming the seam 43. Similarly, the front region 55 and rear region 57 of the left outer panel 54 are coupled together at the rear edge 55a and front edge 57a so as to form the seams 42LU, 42LD, the lap portion 40 and exhaust opening 41L. The leading end 34a of the band portion 34L is sewn to the rear region 57.

Figure 7A:
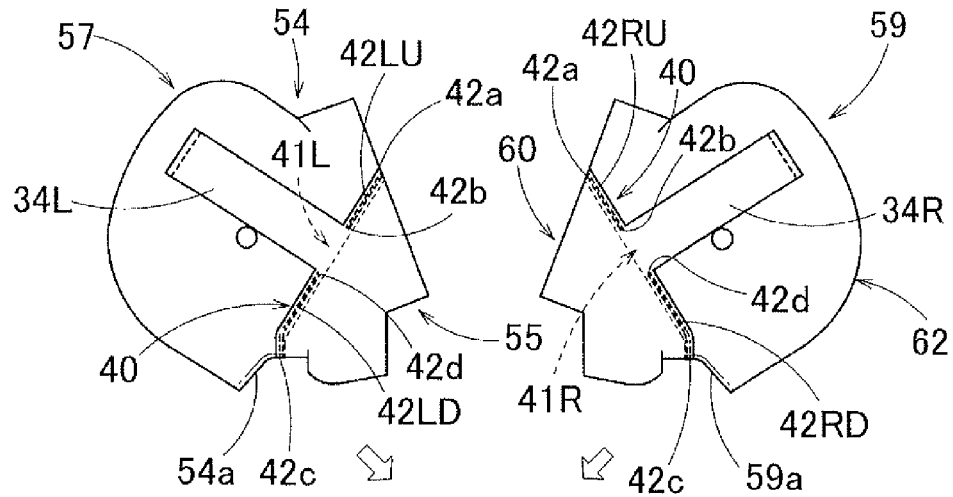
FIGS. 7A, 7B and 7C schematically illustrate the manufacturing process of the airbag of FIG. 2.
Figure 7B:
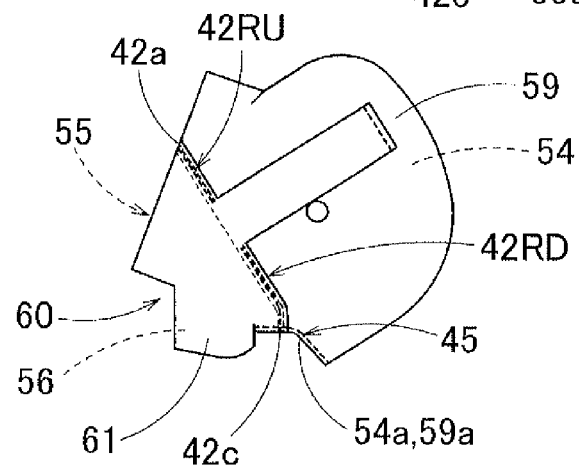
Figure 7C:
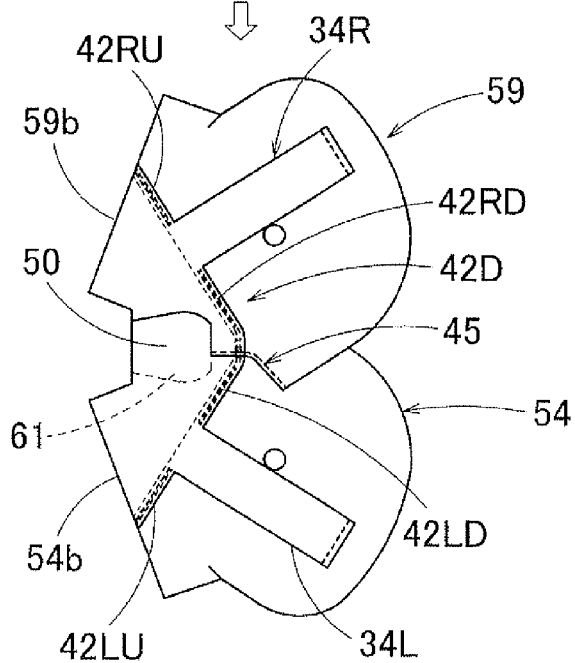
Figure 8A:
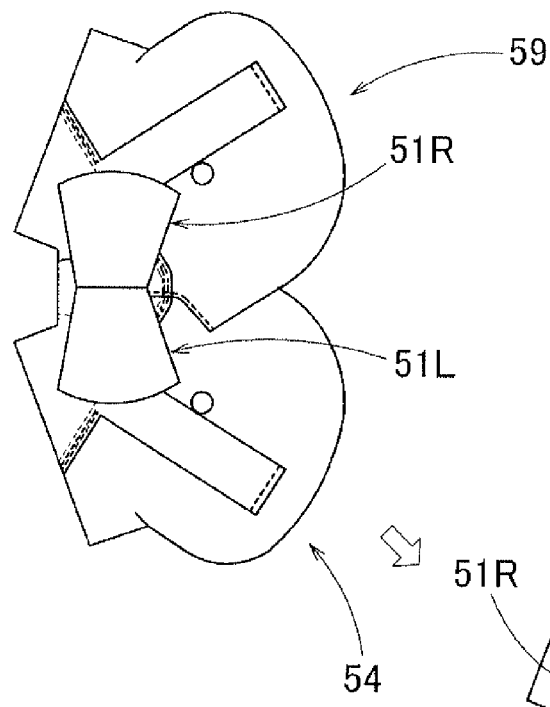
FIGS. 8A, 8B and 8C schematically illustrate the manufacturing process of the airbag of FIG. 2.
Figure 8B:
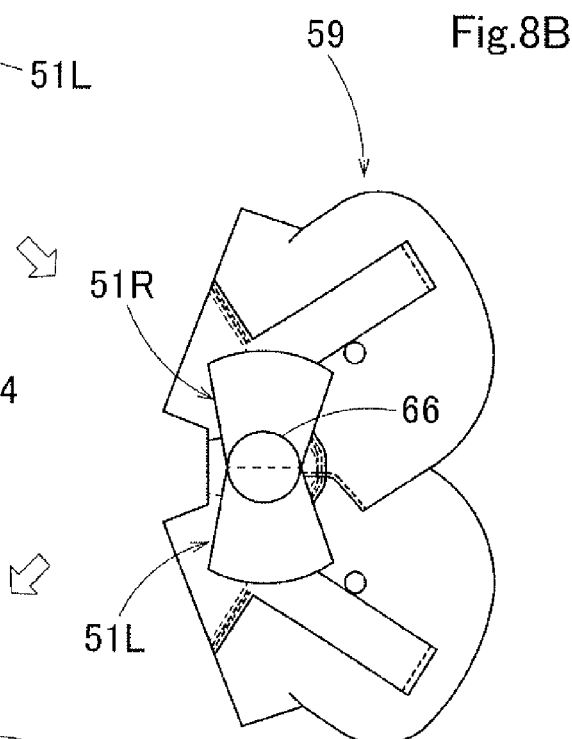
Figure 8C:
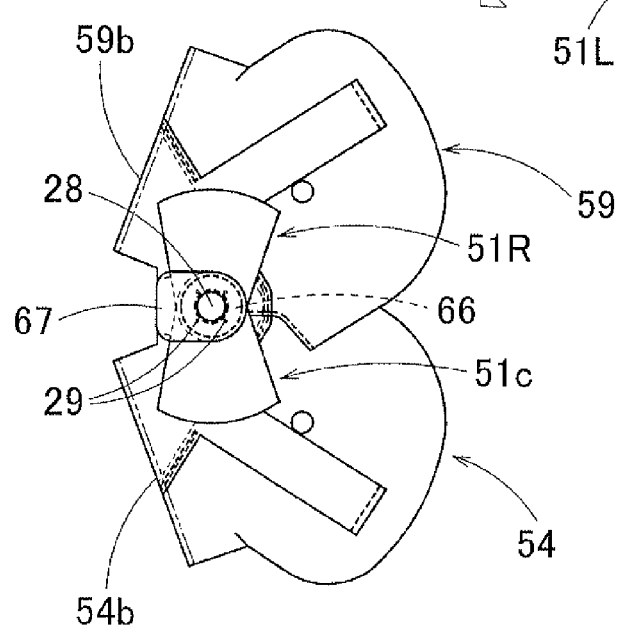

Thereafter, as shown in FIGS. 7A and 7B, the left outer panel 54 and right outer panel 59 are superimposed one above the other such that the circumferential edges align and the front regions 55 and 60 are located on the outside, and lower edges 54a and 59a are sewn together to form a seam 45. Subsequently, as shown in FIG. 7C, the left outer panel 54 and right outer panel 59 are opened from upper front edges 54b and 59b such that the seam allowance of the seam 45 is located inside and the projecting portions 56 and 61 overlap. Then as shown in FIGS. 8A to 8C, the material cloths 51L and 51R, reinforcing cloth 66 and 67 are overlaid on the peripheral area 27 of the gas inlet port 28 in this order, and sewn thereto. Thereafter, cutting is applied so as to form the gas inlet port 28 and mounting holes 29 (FIG. 8C).

Figure 9A:
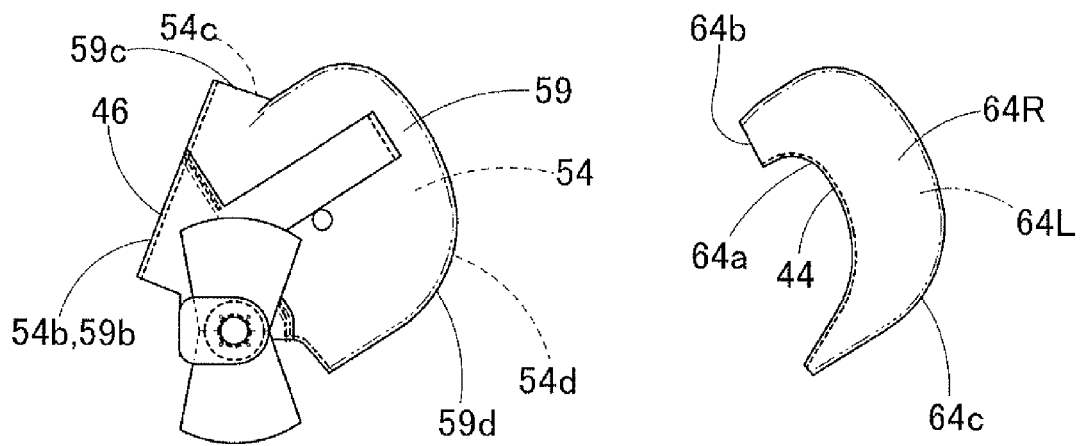
FIGS. 9A, 9B, 9C, 9D and 9E schematically illustrate the manufacturing process of the airbag of FIG. 2.
Figure 9B:
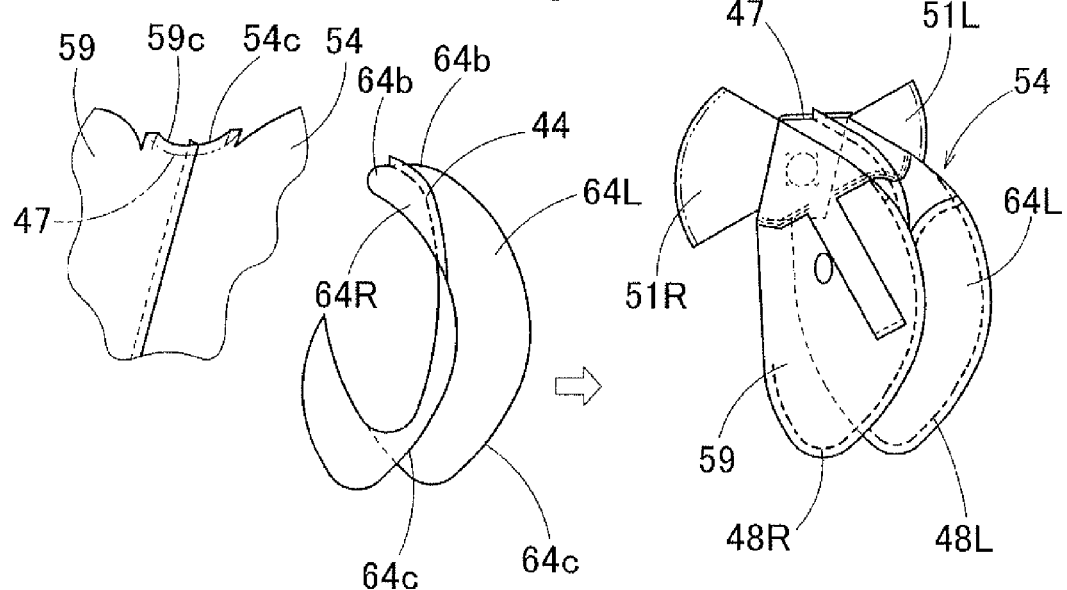
Figure 9C:
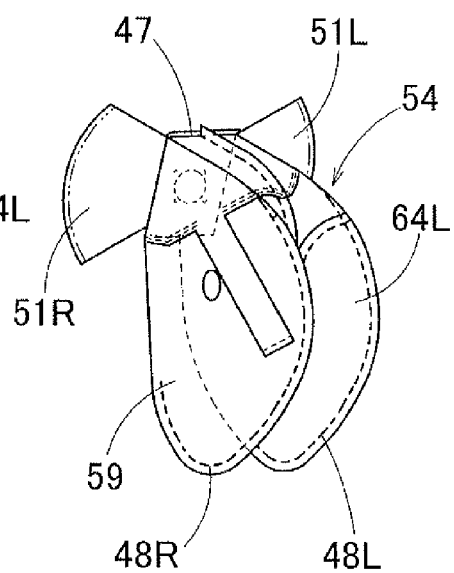

Subsequently, as shown in FIG. 9A, the left outer panel 54 and right outer panel 59 are put together again and the upper front edges 54b and 59b are sewn together to form a seam 46. Then as shown in FIG. 9B, the left outer panel 54 and right outer panel 59 are opened again such that upper rear edges 54c and 59c are separated from each other. The joined left inner panel 64L and right inner panel 64R are opened as well in such a manner as to separate front edges 64b, and the front edges 64b are positioned against the upper rear edges 54c and 59c of left outer panel 54 and right outer panel 59 and sewn thereto to form a seam 47 as shown in FIG. 9C. Subsequently, the rear edge 54d of the left outer panel 54 and the outer edge 64c of the left inner panel 64L are sewn together to form the seam 48L whereas the rear edge 59d of the right outer panel 59 and the outer edge 64c of the right inner panel 64R are sewn together to form the seam 48R.

Figure 9D:
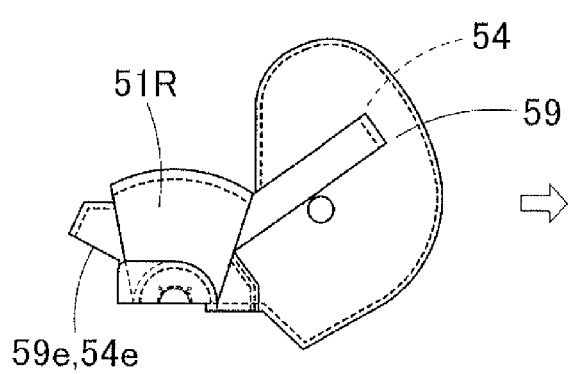
Figure 9E:
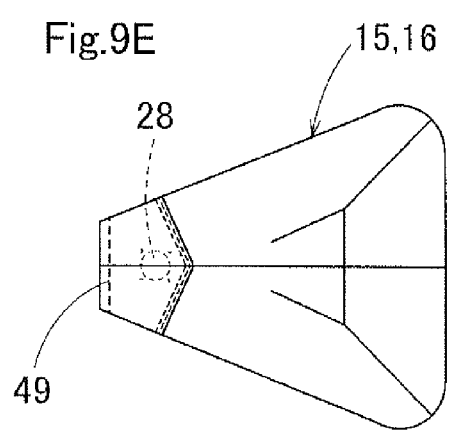

Thereafter, referring to FIG. 9D, corresponding edges of the main bodies 53L and 53R of the material cloths 51L and 51R are sewn together, thus forming the redirecting cloth 50. Then the airbag 15 is reversed inside out utilizing unsewn circumferential edges of the left and right outer panels 54 and 59 (i.e. front edges 54e and 59e) to locate seam allowances inside, and those front edges 54e and 59e are respectively sewn up to form a seam 49 as shown in FIG. 9E. Thus the airbag 15 is completed.

After manufacturing the airbag 15, the retainer 11 is placed inside the airbag 15 so that the bolts 11a project out of the mounting holes 29, and then the airbag 15 is subjected to folding. The folding process includes a preparatory folding step, an anteroposterior contracting step wherein the dimension of the airbag is reduced in an anteroposterior direction and a lateral contracting step wherein the width of the airbag is reduced in a left and right direction.

Figure 10:
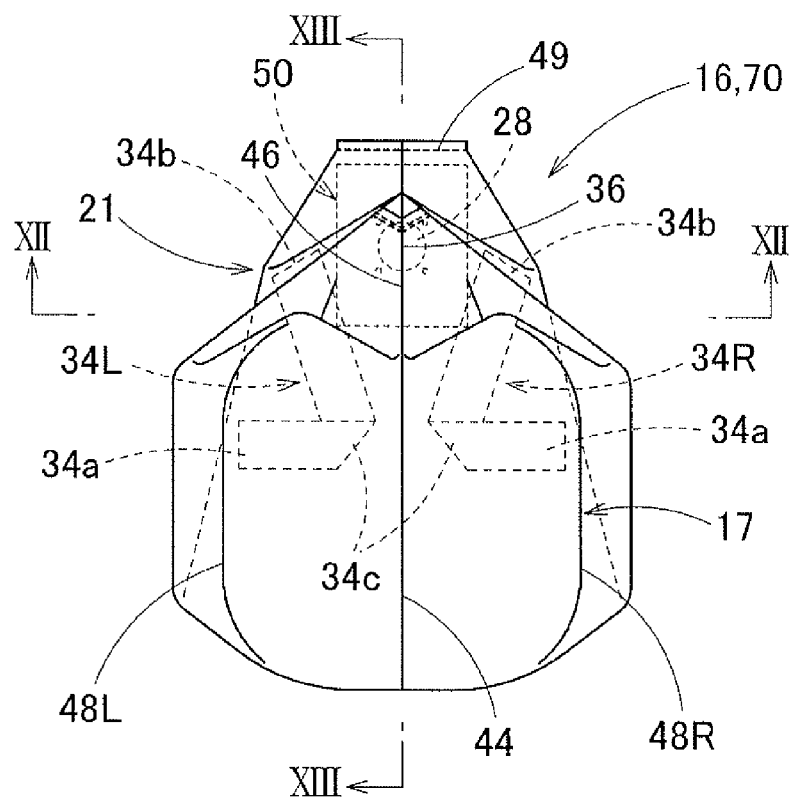
FIG. 10 illustrates the airbag of FIG. 2 in a preparatorily folded condition as viewed from the side of an occupant side wall.
Figure 11:
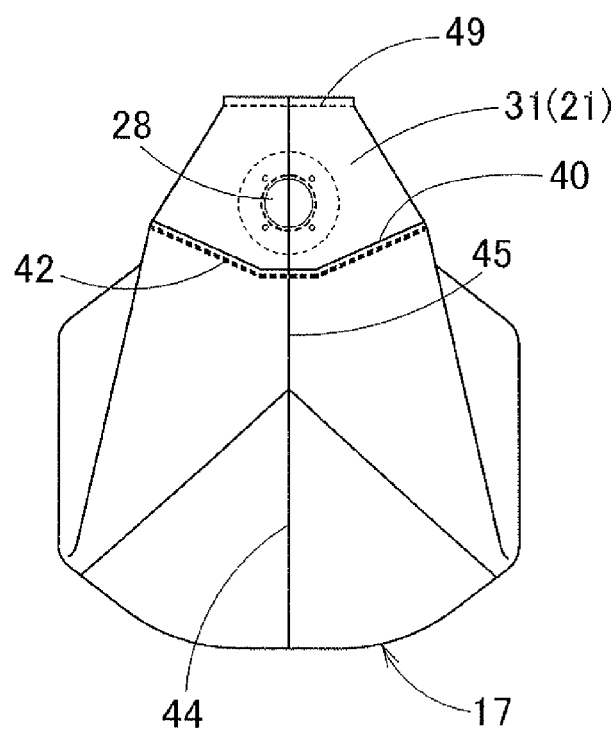
FIG. 11 is a view of the airbag of FIG. 2 in a preparatorily folded condition from the side of a gas inlet port.
Figure 12:
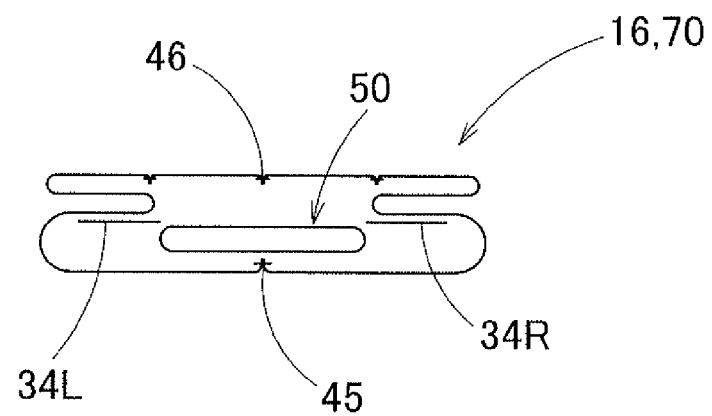
FIG. 12 is an end view taken along line XII-XII of FIG. 10.
Figure 13:
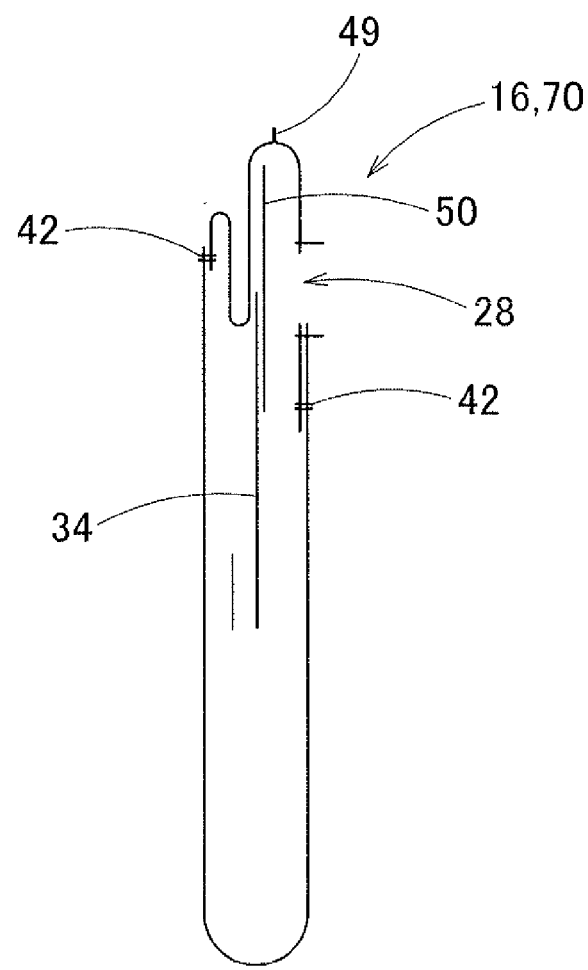
FIG. 13 is an end view taken along line XIII-XIII of FIG. 10.
Figure 14A:
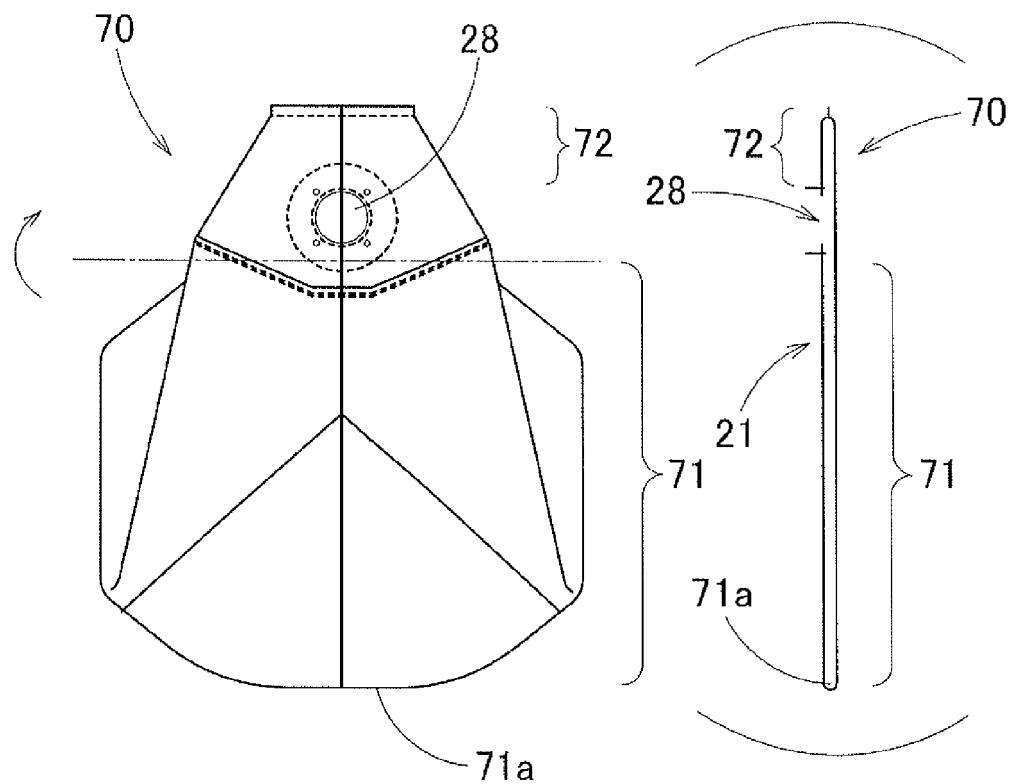
FIGS. 14A and 14B illustrate the folding process of the airbag of FIG. 2 after the preparatory folding step.
Figure 14B:
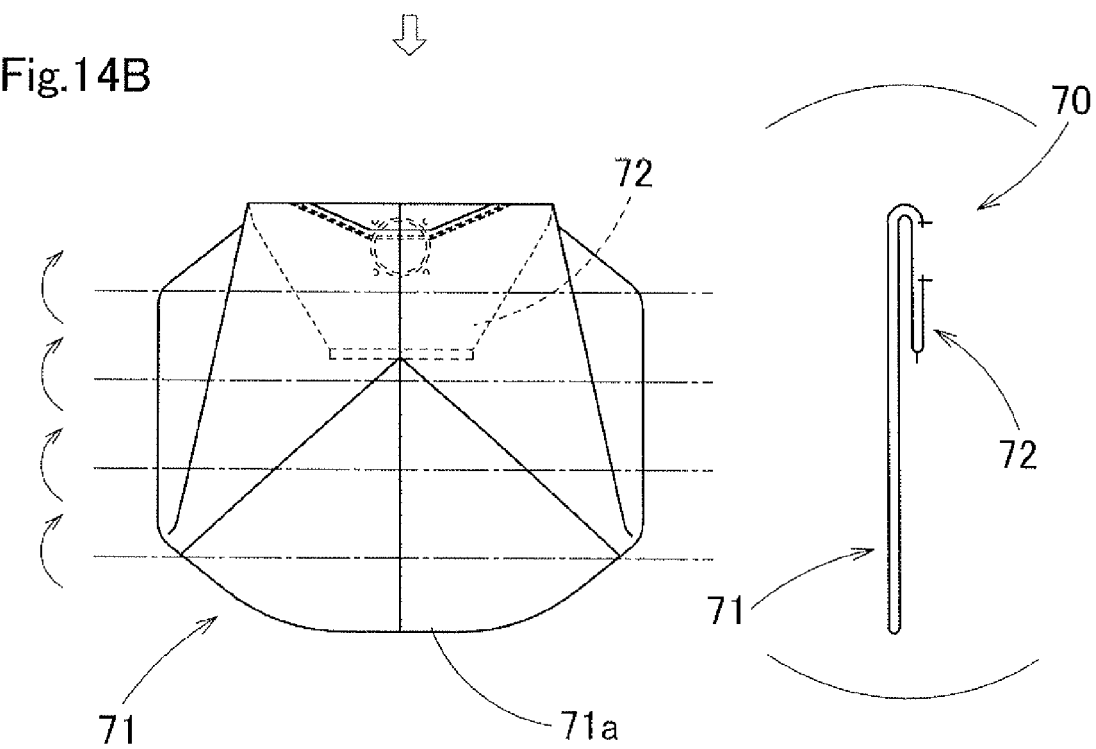

The preparatory folding step provides a "preparatorily folded airbag" 70 as shown in FIGS. 10 to 13. The preparatorily folded airbag 70 has a laterally symmetric contour in which the seam 49 is located foremost, the seams 48L and 48R are on the left and right sides and the seams 44, 45 and 46 extend in a longitudinal direction at the center in a left and right direction. Specifically, as shown in FIGS. 12 and 13, the preparatorily folded airbag 70 is formed by forming a plurality of generally vertical and horizontal creases on the circumferential wall 21 in a laterally symmetrical fashion so the generally whole area of the occupant side wall 17 is flattened out and brought close to the gas inlet port 28. In the preparatorily folded airbag 70, the front end region of the rear section 36 of the circumferential wall 21 opposes the gas inlet port 28 as shown in FIG. 10. The redirecting cloth 50 is placed over the gas inlet port 28 whereas the band portions 34L and 34R of the front section 31 are so arranged that an intermediate region 34c of each of the band portions 34L and 34R, which is a region from the terminal 33 of the front section 31 (the root region 34b) to the leading end 34a, is folded toward the center in a left and right direction, i.e. toward the gas inlet port 28, away from the terminal 33 of the front section 31 (the root region 34b). In this specific embodiment, the band portions 34L and 34R are folded symmetrically inside the airbag 70.

Figure 15A:
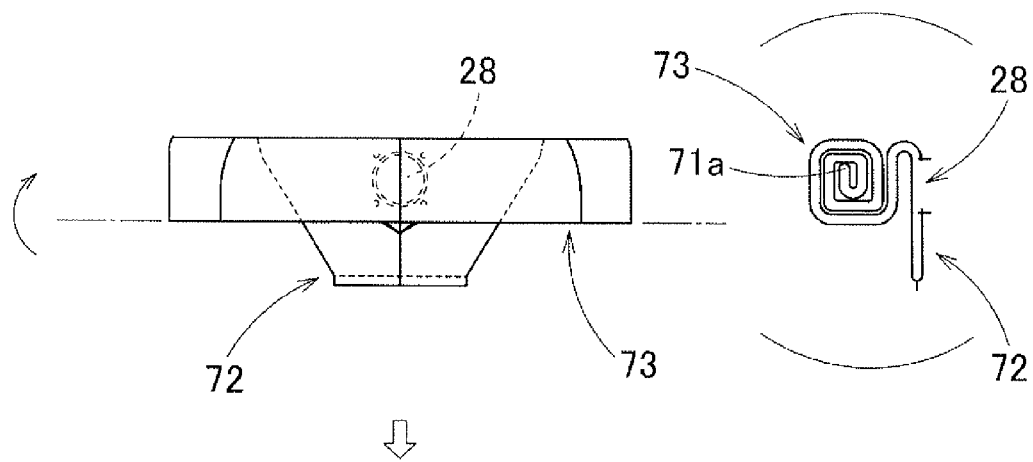
FIGS. 15A, 15B and 15C illustrate the folding process of the airbag of FIG. 2 after the preparatory folding step.
Figure 15B:
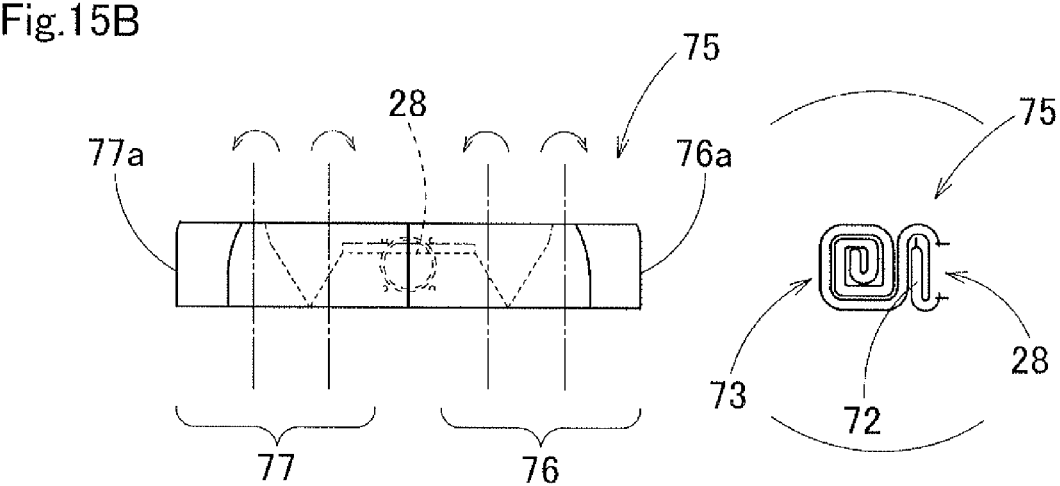
Figure 15C:
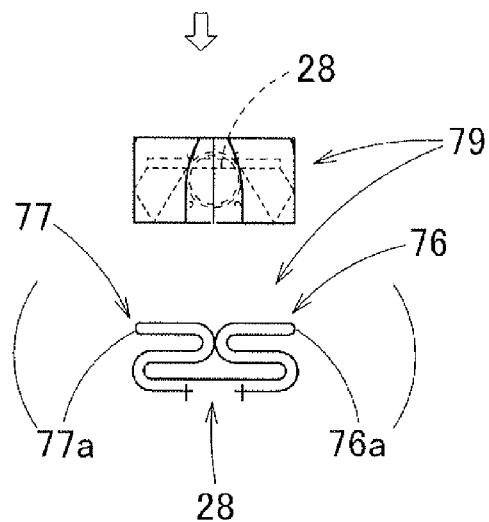

The preparatorily folded airbag 70 is then subjected to the anteroposterior contracting step to reduce the anteroposterior dimension. Specifically, referring to FIGS. 14A, 14B and 15A, the region of the preparatorily folded airbag 70 located at the rear of the gas inlet port 28, namely the rear region 71, is rolled from the rear end 71a toward the circumferential wall 21, on horizontal creases, thus providing a rear folded-up region 73 (FIG. 15A). The rear folded-up region 73 is then placed over the gas inlet port 28. Subsequently, referring to FIGS. 15A and 15B, the region of the preparatorily folded airbag 70 located in front of the gas inlet port 28, namely the front region 72, is folded back and put between the rear folded-up region 73 and gas inlet port 28. Thus an "anteroposterior contracted airbag" 75, which is so contracted in anteroposterior dimension as to fit in the case 6, is provided.

Thereafter, the anteroposterior contracted airbag 75 is subjected to the lateral contracting step to reduce the width in a left and right direction. Specifically, referring to FIGS. 15B and 15C, the left region 76 located on the left of the gas inlet port 28 and right region 77 located on the right of the inlet port 28 in the anteroposterior contracted airbag 75 are respectively folded in a bellows fashion on creases extending in an anteroposterior direction and located on the gas inlet port 28, thus forming a "folded-up body" 79 that is sized, in lateral width, to fit into the case 6.

Thereafter, the folded-up body 79 is wrapped up by a tearable wrapping sheet 13 for keeping the folded-up configuration. Then the airbag 15 is located on the bottom wall 6a of the case while putting the bolts 11a of the retainer 11 through the bottom wall 6a. Subsequently, the inflator body 8a is inserted into the case 6 from below the bottom wall 6a such that the bolts 11a projecting downward from the bottom wall 6a are put through the flange 8c of the inflator 8. If the bolts 11a are nut 12 fastened, the airbag 15 and inflator 8 are mounted on the bottom wall 6a of the case 6.

Then if the circumferential wall 6b of the case 6 is attached to the joint wall 10c of the airbag cover 10 on the dashboard 1 which had been preliminarily mounted on a vehicle, and unillustrated brackets of the case 6 are secured to predetermined locations of the vehicle body structure, the airbag apparatus M for a front passenger's seat is mounted on the vehicle.

In the event of a frontal collision of the vehicle, the airbag 15 is fed with inflation gas discharged from the gas discharge ports 8b of the inflator 8. When inflated, the airbag 15 breaks the wrapping sheet 13 and pushes and opens the doors 10a and 10b of the airbag cover 10 as shown in FIGS. 1 and 23. Then the airbag 15 protrudes upward from the opening of the case 6 provided by the opening of the doors 10a and 10b, and deploys rearward in such a manner as to fill a space between the top plane 2 of the dashboard 1 and windshield 4.

The airbag apparatus M includes on the circumferential wall 21 of the bag body 16 the exhaust openings 41L and 41R that open when contacting a nearby occupant (small occupant NP1, NP2 such as an infant) in the course of inflation and close at full inflation of airbag.

Specifically, the exhaust openings 41L and 41R are comprised of uncoupled regions of the lap portion 40. The lap portion 40 is so formed that the terminal region 33 of the front section 31 is located beneath or inside the terminal region 38 of the rear section 36. The front section 31 includes the band portions 34L and 34R that extend from the locations of the exhaust openings 41L and 41R on the terminal region 33 toward the projecting point of the airbag at full inflation (i.e. toward the occupant side wall 17) and coupled to the rear section 36 by the leading ends 34a. As shown in FIG. 10, in the folded-up and housed condition of the airbag 15, the intermediate region 34c of each of the band portions 34L and 34R, i.e. the region from the terminal 33 of the front section 31 (the root region 34b) to the leading end 34a, is folded toward the center in a left and right direction, i.e. toward the gas inlet port 28, away from the terminal 33 of the front section 31 (the root region 34b). Since the airbag 15 is internally provided with the redirecting cloth 50 redirecting inflation gas toward the front and rear, the inflation gas G fed from the gas inlet port 28 flows into the bag body 16 along an anteroposterior direction via the openings 50a and 50b.

When the inflation gas flows into the bag body 16 from the openings 50a and 50b of the redirecting cloth 50, the airbag 15 emerges from the opening provided by opening of the doors 10a and 10b of the airbag cover 10 while undoing the folds formed in the lateral and anteroposterior contracting steps. When the anteroposterior contraction is undone, the front region 72 of the preparatorily folded airbag 70 pushes up the rear folded-up region 73 located there above, and then the rear folded-up region 73 unrolls and the occupant side wall 17 deploys generally upright as if the upper end 17a is lifted and moves rearward. Thus inflation of the airbag 15 is completed.

Figure 21A:
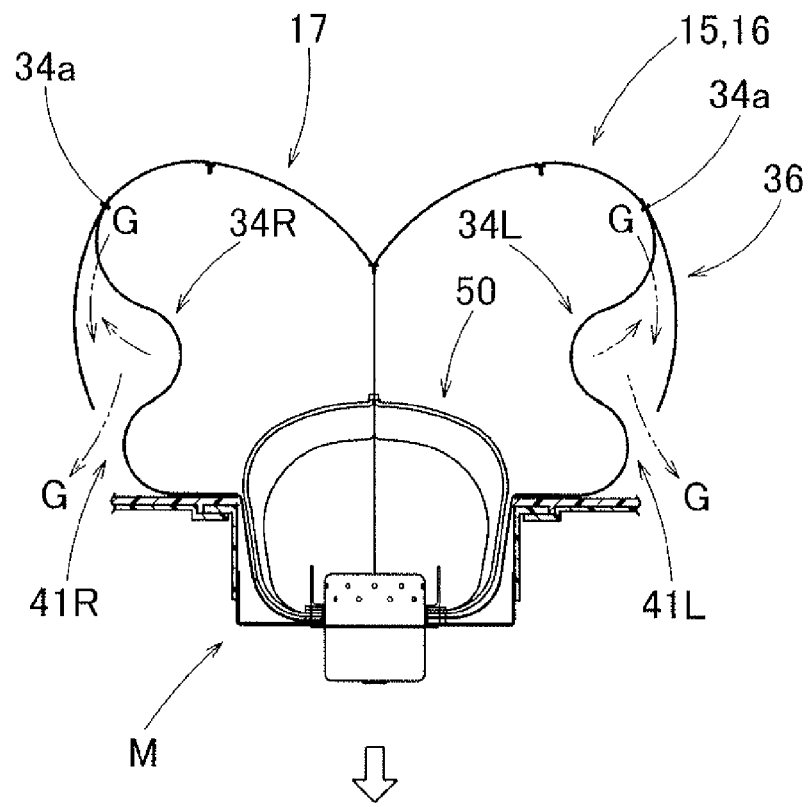
FIGS. 21A and 21B are schematic horizontal sections of the airbag apparatus illustrating the deployment of the airbag.

In the initial stage of airbag inflation, due to the redirection by the redirecting cloth 50, the inflation gas G does not flow toward the band portions 34L and 34R, but flows along the inner circumference of the rear section 36 of the circumferential wall 21 as shown in FIGS. 17 and 21A, such that the band portions 34L and 34R are kept folded toward the center in a left and right direction of the airbag 15 (FIG. 21A). At this time, the band portions 34L and 34R kept folded toward the center (or a friction force exerted between the band portions 34L and 34R and environment and an inertia force of the band portions 34L and 34R) pull the terminal region 33 of the front section 31 inward and away from the rear section 36, so that the terminal regions 33 and 38 of the front section 31 and rear section 36 are separated from each other at the uncoupled or unsewn regions 39, and thus providing the exhaust openings 41L and 41R as shown in FIGS. 17 and 20 so the inflation gas G is vented to the outside.

Figure 16:
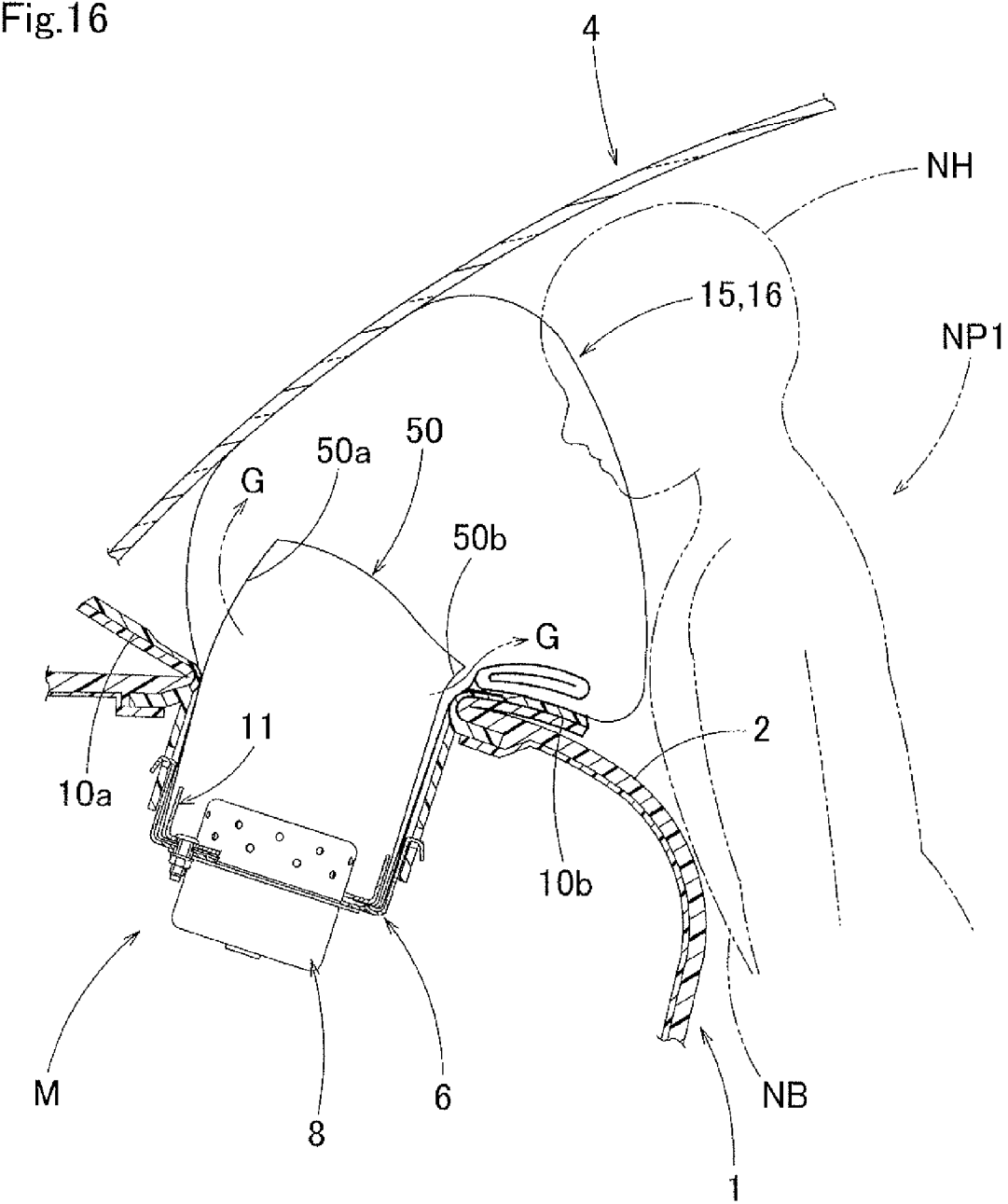
FIG. 16 is a schematic section of the airbag apparatus of FIG. 1 in service, taken along an anteroposteior direction.
Figure 17:
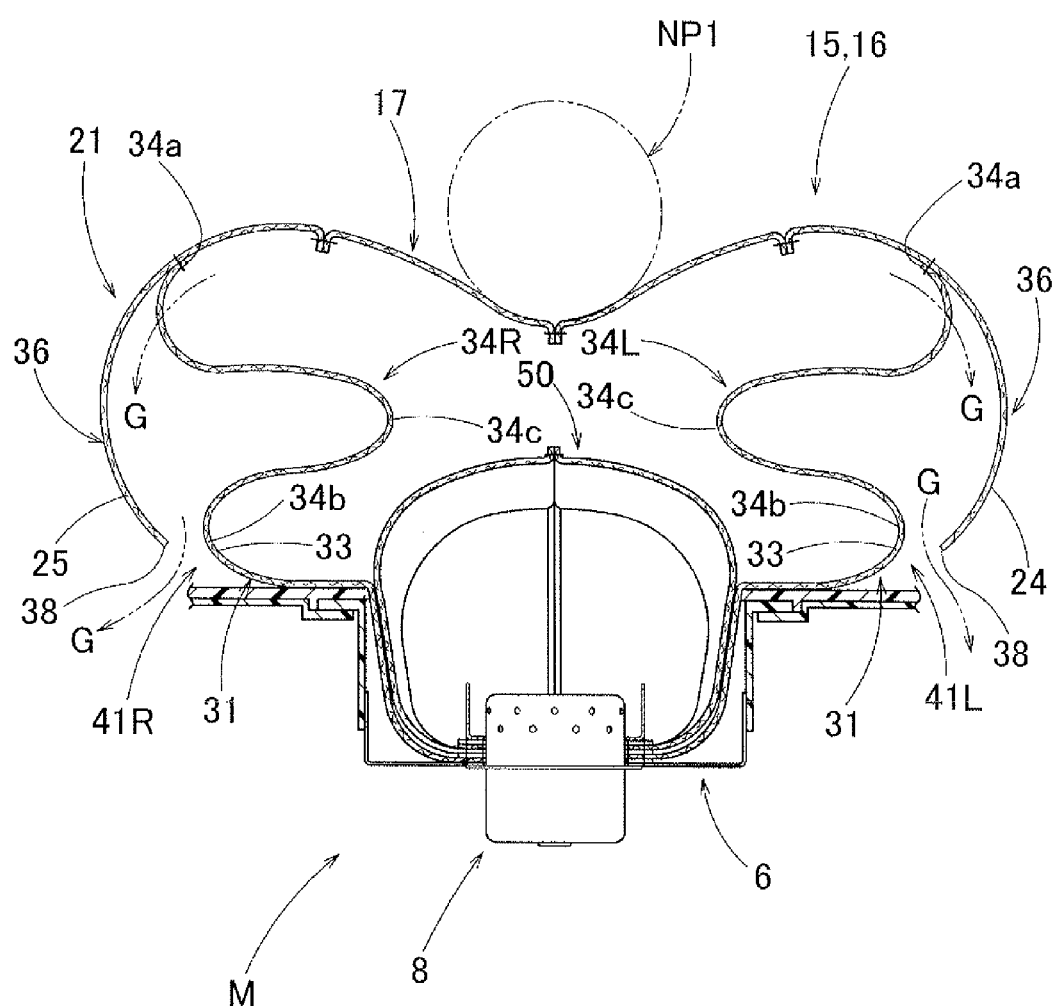
FIG. 17 is a schematic horizontal section of the airbag apparatus of FIG. 1 in service.

If at this time an occupant NP1, especially a small occupant NP1, is so close as to be contacting the windshield 4 by the head NH and contacting the dashboard 1 by the abdomen NB as shown in FIG. 16, the bag body 16 bumps against the occupant NP1 in a laterally unfurled state having the exhaust openings 41L and 41R open. Accordingly, the inflation gas is smoothly vented from the exhaust openings 41L and 41R and the occupant NP1 is prevented from being pressed unduly.

Figure 18:
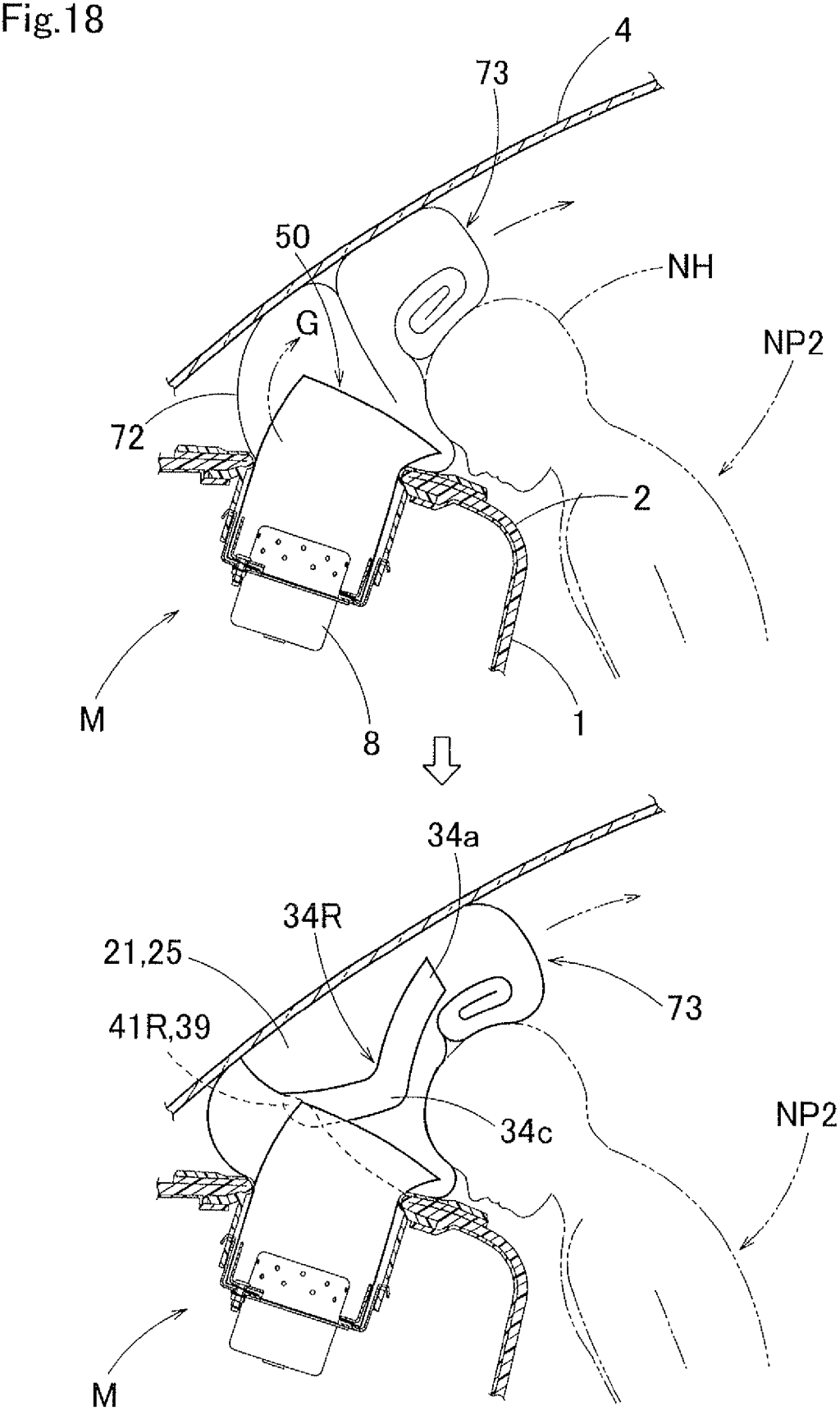
FIGS. 18 and 19 schematically illustrate the deployment of the airbag by sectional views taken along an anteroposterior direction.
Figure 19:
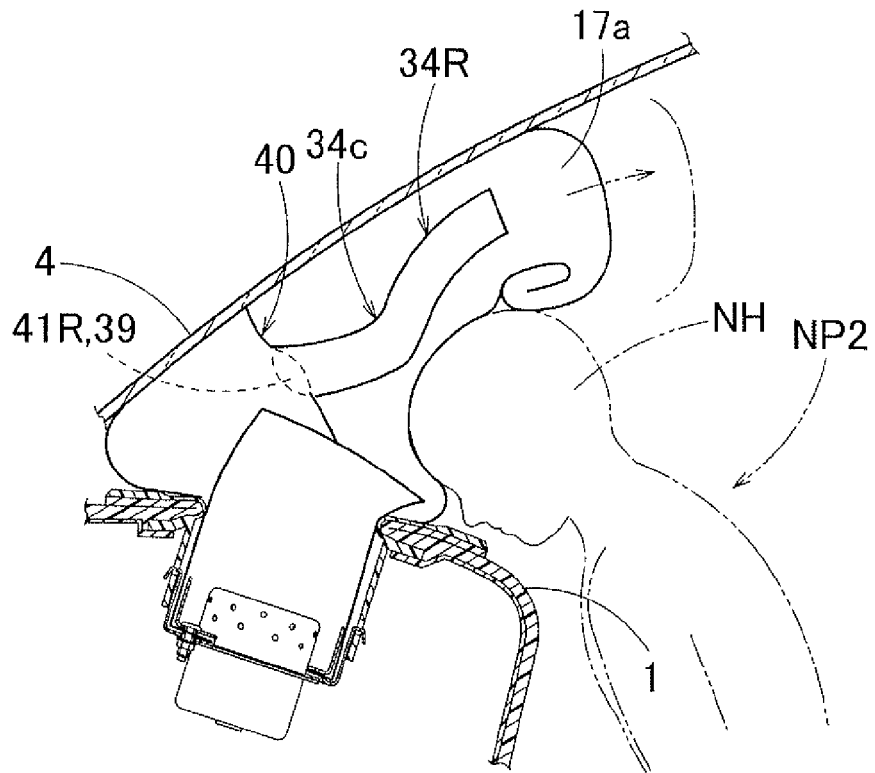
Figure 19:
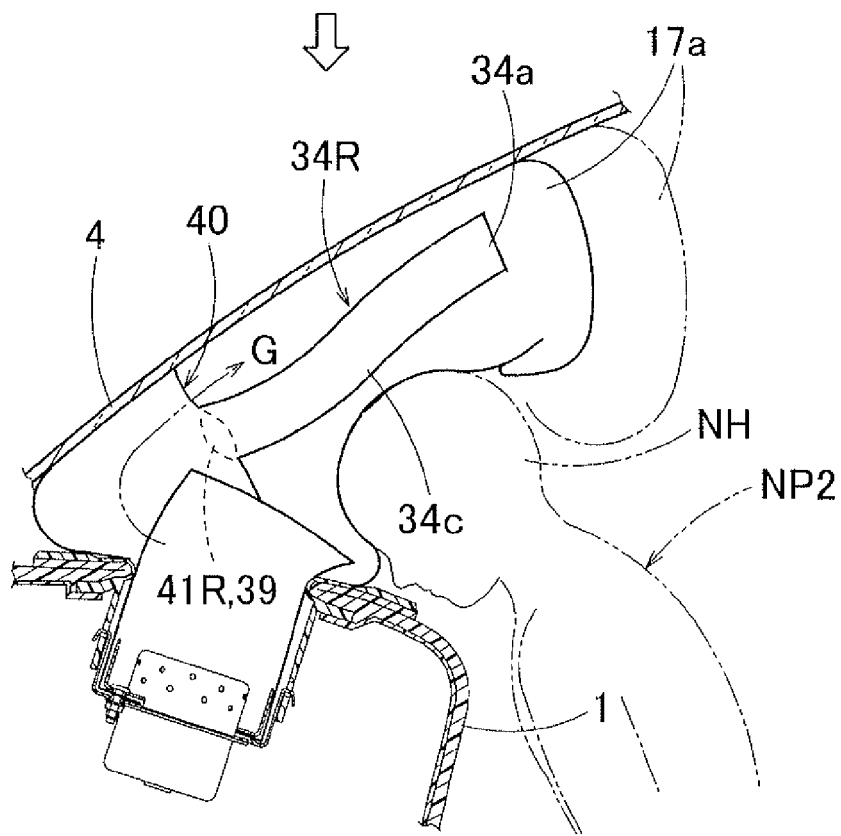

If an occupant NP2, especially a small occupant NP2, is so close to the dashboard 1 by the head NH by leaning on the dashboard 1 or the like as shown in FIG. 18, the bag body 16 deploys rearward in such a manner as to make the rear folded-up region 73 to pass through the space between the windshield 4 and the head NH of the occupant NP2. At this time, the rear folded-up region 73 moves rearward with the band portions 34L and 34R folded toward the center so the exhaust openings 41L and 41R remain open and allow the inflation gas to be vented, thus preventing the occupant NP2 from being pressed unduly. After this, the rear folded-up region 73 rides over the head NH and projects rearward as shown in FIG. 19. At this time, since the band portions 34L and 34R are sewn to the vicinity of the upper end 17a of the occupant side wall 17, the band portions 34L and 34R move rearward together with the upper end 17a of the occupant side wall 17 without so extending as to close off the exhaust openings 41L and 41R, as shown in FIG. 19, such that the exhaust openings 41L and 41R remain open. Thus the rear folded-up region 73 is prevented from inflating too much and pressing the occupant NP2. Therefore, the occupant NP2 is properly protected in this situation as well.

Figure 21B:
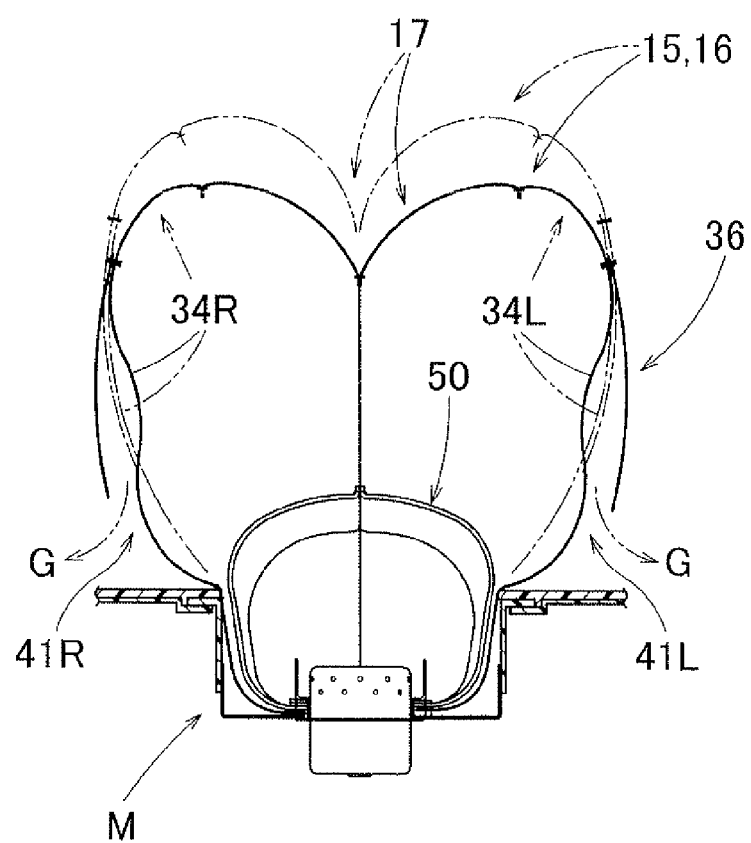

On the other hand, when an occupant MP is seated in a normal position, the airbag 15 inflates without contacting the occupant MP until the occupant side wall 17 moves rearward, so that the band portions 34L and 34R unfold and extend along with the rearward movement of the occupant side wall 17 as shown in FIGS. 21A and 21B. The band portions 34L and 34R are continuous with the front section 31 and the length L1 of each of the band portions 34L and 34R is so determined that the distance D1 between the front edge 33a of the terminal region 33 in the front section 31, which refers to the boundary between the terminal region 33 and general region 32 and equals to the front edge 38a of the terminal region 38 of the rear section 36, and the leading end 34a of the band portion 34L/34R conforms to the film length D2 (FIG. 2) of the rear section 36 between the front edge 38a of the terminal region 38 and the seam 43 of the band portions 34L/34R.

With this configuration, when the band portions 34L and 34R unfold and extend along with the rearward movement of the occupant side wall 17, the leading ends 34a of the band portions 34L and 34R move rearward along with the movement of the occupant side wall 17 as well, as shown in FIGS. 21A and 21B. At the same time, the inner pressure of the bag body 16 due to inflow of inflation gas holds the band portions 34L and 34R down onto the inner circumference of the rear section 36 and arranges the same along the inner circumference of the rear section 36. When the airbag 15 completes deployment, the terminal region 33 of the front section 31 is held down on and arranged along the terminal region 38 of the rear section 36 at the locations of the exhaust openings 41L and 41R, and thus closing the exhaust openings 41L and 41R. As a result, the airbag 15 completes deployment without releasing inflation gas from the exhaust openings 41L and 41R, and protects the occupant MP seated at normal position with sufficient cushioning property.

The exhaust openings 41L and 41R of the airbag apparatus M are formed on the left side wall 24 and right side wall 25 of the circumferential wall 21, i.e. on laterals of the airbag 15 at full deployment. That is, the exhaust openings 41L and 41R are formed on the area which is not expected to contact with the windshield 4 or dashboard 1 upon airbag deployment. Accordingly, the exhaust openings 41L and 41R will securely open when contacting a (small) nearby occupant NP1 or NP2.

Therefore, the airbag apparatus M for a front passenger's seat embodying the present invention is capable of protecting a nearby occupant NP1/NP2 properly without giving him/her an undue pressure even on such a vehicle that a distance between the top plane 2 of the dashboard 1 and windshield 4 is small.

Moreover, since the exhaust openings 41L and 41R are formed on both of the left side wall 24 and right side wall 25 of the bag body 16, the airbag 15 will inflate into a steady contour quickly, without oscillating in a left and right direction. Without considering this advantage, the exhaust opening may be formed on only either the left side wall or right side wall.

Before the airbag 15 of the airbag apparatus M is housed in the case 6, the airbag 15 is firstly formed into a preparatorily folded condition where the occupant side wall 17 is generally entirely flattened out and located close to the gas inlet port 28 whereas the circumferential wall 21 is folded on creases. Then the airbag 15 in that state is subjected to the anteroposterior and lateral contracting steps to reduce the anteroposterior and lateral dimensions of the airbag 15. In the initial stage of airbag deployment, this folding method and order will make the airbag 15 firstly unfurl in anteroposterior and left and right directions, and then unfold the folds formed on the circumferential wall 21 in the pareparatory folding step. This will enable the intermediate regions 34c of the band portions 34L and 34R to stay folded toward the center in a left and right direction of the airbag 15 during the initial stage of airbag inflation so the exhaust openings 41L and 41R securely open when the airbag 15 (airbag body 16) contacts a nearby occupant.

Although the lap portion 40 of the airbag apparatus M of the foregoing embodiment is so formed on the circumferential wall 21 as to encircle the gas inlet port 28 thoroughly, the configuration of the lap portion should not be limited thereby. It will also be appreciated to locate the lap portion only on the left side wall and/or right side wall so part thereof provides an exhaust opening, or only on the location of the exhaust opening.

Although the width of each of the band portions 34L and 34R in the foregoing embodiment is generally identical to the opening dimension of each of the exhaust openings 41L and 41R, the width of the band portion should not be limited thereby, but may be smaller than the opening dimension of the exhaust opening. However, if it conforms to the opening dimension of the exhaust opening as in the foregoing embodiment, the band portion will be able to pull the terminal region of the front section of the circumferential wall on the location of the exhaust opening over the entire width of the exhaust hole, which will steady the opening of the exhaust hole.

Since the band portions 34L and 34R of the foregoing embodiment are configured to extend generally along the deployment direction of the airbag 15 at full inflation, the exhaust openings 41L and 41R are closed in a steady fashion at full deployment of the airbag 15.

Furthermore, in the foregoing embodiment, the occupant side wall 17 at full deployment includes at the center in a left and right direction the recessed area 18 that recesses forward and extends vertically generally throughout the occupant side wall 17. On the left and right of the recessed area 18 are raised regions 19L and 19R that extend vertically and continuously. Therefore the occupant side wall 17 will be prevented from giving an undue pressure to a nearby occupant when contacting him/her by the laterally central area in the initial stage of airbag inflation. When the fully inflated airbag 15 contacts an occupant seated in a normal position, the airbag 15 firstly restrain his/her shoulders by the raised regions 19L and 19R and allows the head to enter into the recess 18 so an area around the recess 18 cushions the head. Therefore the head of the occupant will be protected in a soft fashion.

Although the airbag 15 of the foregoing embodiment has been described as is formed by sewing together predetermined-shaped base cloths, the airbag may also be formed by connecting such base cloths together by adhesive or the like.

Although the band portions 34L and 34R have been described as connected to the rear section 36 of the circumferential wall 21 by the leading ends (rear ends) 34a, the band portions 34L and 34R may be connected to the occupant side wall 17.

What is claimed is:

1. An airbag apparatus adapted to be mounted on an interior of a top plane of an instrument panel in front of a front passenger's seat of a vehicle, comprising:

an inflatable airbag housed in a housing in a folded-up configuration for deployment in a space between the instrument panel and a windshield, the airbag including:
an occupant side wall deployable generally upright toward the seat;
a circumferential wall extending forward from the peripheral edge of the occupant side wall in a tapering fashion, and the airbag at full inflation having a generally conical contour whose top is located at a front end of the airbag adjacent the instrument panel, the circumferential wall including a front section adjoining the front end of the airbag at full inflation and a rear section adjoining the occupant side wall, wherein the front section and rear section overlap with each other at respective terminals such that the terminal of the front section is located inside of that of the rear section and the terminals are partially coupled together, thus providing a lap portion;

an inlet port located proximate the front end of the airbag at full inflation in the front section of the circumferential wall for introducing inflation gas;

an exhaust opening formed at least either on a left side or right side of the circumferential wall and comprised of an uncoupled region of the lap portion, the exhaust opening being openable for exhausting inflation gas when contacting an occupant seated close to the airbag apparatus in the course of inflation and closing at full inflation of the airbag;

a redirecting cloth located inside the airbag so as to cover the inlet port and provided on opposite ends in an anteroposterior direction with openings for releasing inflation gas to the front and rear sections; and a band portion that is formed on the terminal of the front section of the circumferential wall, the band portion extending from the location of the exhaust opening on the terminal toward a projecting point of the airbag at full inflation and being coupled to the rear section or occupant side wall by a leading end thereof;

wherein a length of the band portion from a front end of the terminal of the front section to the leading end of the band portion equals to a film length of the rear section from a front end of the terminal of the rear section to a seam of the band portion; and wherein, in a folded-up and housed condition of the airbag, the band portion is folded toward a center thereof in a left and right direction of the airbag, away from the terminal of the front section.

2. The airbag apparatus as set forth in claim 1, wherein the exhaust opening is formed on both the left side and right side of the circumferential wall.

3. The airbag apparatus as set forth in claim 1, wherein the leading end of the band portion is coupled to the rear section of the circumferential wall.

4. The airbag apparatus as set forth in claim 1, wherein the airbag, prior to being contracted in dimension in anteroposterior and left and right directions and housed in the housing, includes a preparatorily folded condition where the occupant side wall is generally entirely flattened out and located close to the gas inlet port whereas the circumferential wall is folded on creases.

5. The airbag apparatus as set forth in claim 1, wherein a width of the band portion is generally identical to an opening dimension of the exhaust opening.

6. The airbag apparatus as set forth in claim 1, wherein the band portion extends generally along the deployment direction of the airbag at full inflation of the airbag.

7. The airbag apparatus as set forth in claim 1, wherein the occupant side wall at full inflation includes at the center in a left and right direction a recessed area that extends vertically generally throughout the occupant side wall.

* * * * *